(12) United States Patent
Borras et al.

(10) Patent No.: US 12,215,044 B2
(45) Date of Patent: *Feb. 4, 2025

(54) SYSTEM FOR REMOVAL OF PHOSPHORUS AND NITROGEN FROM WATER

(71) Applicant: NuQuatic, LLC, St. Paul, MN (US)

(72) Inventors: Carlos Borras, Apopka, FL (US); Donald A. Luke, Valrico, FL (US)

(73) Assignee: NuQuatic, LLC, St. Paul, MN (US)

( * ) Notice: Subject to any disclaimer, the term of this patent is extended or adjusted under 35 U.S.C. 154(b) by 324 days.

This patent is subject to a terminal disclaimer.

(21) Appl. No.: 17/530,907

(22) Filed: Nov. 19, 2021

(65) Prior Publication Data

US 2022/0073383 A1 Mar. 10, 2022

Related U.S. Application Data

(60) Division of application No. 17/249,345, filed on Feb. 26, 2021, now Pat. No. 11,220,443, which is a
(Continued)

(51) Int. Cl.
*C02F 1/461* (2023.01)
*C02F 1/00* (2023.01)
(Continued)

(52) U.S. Cl.
CPC .......... *C02F 1/46176* (2013.01); *C02F 1/001* (2013.01); *C02F 1/4676* (2013.01);
(Continued)

(58) Field of Classification Search
None
See application file for complete search history.

(56) References Cited

U.S. PATENT DOCUMENTS

| | | |
|---|---|---|
| 1,018,355 A | 2/1912 | Galbreath |
| 2,449,706 A | 9/1948 | Jones |
| | (Continued) | |

FOREIGN PATENT DOCUMENTS

| | | |
|---|---|---|
| AU | 2020291450 | 2/2023 |
| CA | 2953591 | 7/2018 |
| | (Continued) | |

OTHER PUBLICATIONS

"Canadian Application Serial No. 3,140, 149, Response filed Jun. 8, 2023 to Examiners Rule 86(2) Requisition mailed Feb. 27, 2023", 33 pgs.

(Continued)

*Primary Examiner* — Hayden Brewster
(74) *Attorney, Agent, or Firm* — Schwegman Lundberg & Woessner, P.A.

(57) ABSTRACT

Various embodiments relate to methods and systems for removing phosphorus and/or nitrogen from water. A method of removing phosphorus and nitrogen from water includes passing starting material water including nitrogen and phosphorus through an elevated pH phosphorus removal stage. The method includes passing the water through an electrolytic nitrogen removal stage. The method includes passing the water through a galvanic phosphorus removal stage. The water produced by the method has a lower phosphorus concentration and a lower nitrogen concentration than the starting material water.

18 Claims, 13 Drawing Sheets

Related U.S. Application Data continuation of application No. PCT/US2020/037407, filed on Jun. 12, 2020.

(60) Provisional application No. 62/860,433, filed on Jun. 12, 2019.

(51) Int. Cl.

| | | |
|---|---|---|
| *C02F 1/467* | (2023.01) | |
| *C02F 1/52* | (2023.01) | |
| *C02F 1/58* | (2023.01) | |
| *C02F 1/66* | (2023.01) | |
| *C02F 101/10* | (2006.01) | |
| *C02F 101/16* | (2006.01) | |
| *C02F 101/20* | (2006.01) | |
| *C25B 1/00* | (2021.01) | |
| *C25B 1/20* | (2006.01) | |
| *C25B 1/50* | (2021.01) | |
| *C25B 9/65* | (2021.01) | |

(52) U.S. Cl.
CPC ............ *C02F 1/5254* (2013.01); *C02F 1/586* (2013.01); *C02F 1/66* (2013.01); *C25B 1/00* (2013.01); *C25B 1/20* (2013.01); *C25B 1/50* (2021.01); *C25B 9/65* (2021.01); *C02F 2001/46119* (2013.01); *C02F 2001/46133* (2013.01); *C02F 2101/105* (2013.01); *C02F 2101/16* (2013.01); *C02F 2101/20* (2013.01); *C02F 2209/06* (2013.01)

(56) References Cited

U.S. PATENT DOCUMENTS

| | | | |
|---|---|---|---|
| 3,385,785 A | 5/1968 | Forrest et al. | |
| 3,425,925 A | 2/1969 | Fleischman | |
| 3,660,162 A | 5/1972 | Eisenberg | |
| 3,766,045 A | 10/1973 | Itakura et al. | |
| 3,901,804 A | 8/1975 | Ohuchi et al. | |
| 4,011,151 A | 3/1977 | Ito et al. | |
| 4,179,347 A | 12/1979 | Krause et al. | |
| 4,388,195 A | 6/1983 | Von et al. | |
| 4,655,895 A | 4/1987 | Feofanov et al. | |
| 5,167,777 A | 12/1992 | Kaczur et al. | |
| 5,439,566 A | 8/1995 | Zucker | |
| 5,454,917 A | 10/1995 | Mattison et al. | |
| 5,876,575 A | 3/1999 | Kump | |
| 5,976,383 A | 11/1999 | Guess et al. | |
| 6,149,797 A | 11/2000 | Carey et al. | |
| 6,180,014 B1* | 1/2001 | Salama ................ C02F 1/4672 205/636 |
| 6,210,587 B1 | 4/2001 | Vion | |
| 6,893,567 B1 | 5/2005 | Vanotti et al. | |
| 7,118,665 B2 | 10/2006 | Kin et al. | |
| 7,582,198 B2 | 9/2009 | Wilkins et al. | |
| 7,704,353 B2 | 4/2010 | Stadelmann et al. | |
| 7,815,779 B2 | 10/2010 | Flettner | |
| 7,858,598 B2 | 12/2010 | Yang et al. | |
| 8,147,695 B2 | 4/2012 | Banerjee et al. | |
| 8,673,129 B2 | 3/2014 | Gordon et al. | |
| 8,715,469 B2 | 5/2014 | Pancurák et al. | |
| 8,926,804 B2 | 1/2015 | Pancurák et al. | |
| 9,346,692 B2 | 5/2016 | Combs et al. | |
| 9,446,974 B2 | 9/2016 | Milner et al. | |
| 9,580,338 B2 | 2/2017 | Fujikane et al. | |
| 9,593,030 B2 | 3/2017 | Fujikane et al. | |
| 9,637,403 B2 | 5/2017 | Mckay et al. | |
| 9,865,860 B2 | 1/2018 | Fauland | |
| 10,003,095 B2 | 6/2018 | Kovacs et al. | |
| 10,071,921 B2 | 9/2018 | Johnson et al. | |
| 10,230,119 B2 | 3/2019 | Kovacs et al. | |
| 10,266,428 B1 | 4/2019 | Brian | |
| 10,343,937 B2 | 7/2019 | Casbeer et al. | |
| 10,427,195 B2 | 10/2019 | Ball | |
| 10,513,786 B2 | 12/2019 | Beddoes et al. | |
| 10,519,052 B2 | 12/2019 | Ball et al. | |
| 10,538,436 B2 | 1/2020 | Hu et al. | |
| 10,611,651 B2 | 4/2020 | Martikainen et al. | |
| 10,665,846 B2 | 5/2020 | Fauland | |
| 10,676,378 B2 | 6/2020 | Tandukar et al. | |
| 10,700,392 B2 | 6/2020 | Pantel et al. | |
| 10,752,521 B2 | 8/2020 | Nelson | |
| 10,800,678 B2 | 10/2020 | Gifford et al. | |
| 10,808,327 B2 | 10/2020 | Griffis et al. | |
| 10,865,128 B2 | 12/2020 | Ball | |
| 10,882,766 B2 | 1/2021 | Taylor | |
| 10,954,144 B2 | 3/2021 | Ball et al. | |
| 11,136,248 B2 | 10/2021 | Pettersson et al. | |
| 11,148,964 B2 | 10/2021 | Ball | |
| 11,220,443 B2* | 1/2022 | Borras .................. C02F 1/463 |
| 11,225,420 B2 | 1/2022 | Borras et al. | |
| 11,312,646 B2 | 4/2022 | Gunasekaran et al. | |
| 11,345,620 B2 | 5/2022 | Zhu et al. | |
| 11,384,441 B2 | 7/2022 | Beddoes et al. | |
| 11,401,180 B2 | 8/2022 | Dejarme et al. | |
| 11,401,181 B1 | 8/2022 | Borras et al. | |
| 11,407,666 B2 | 8/2022 | Rosansky et al. | |
| 11,433,152 B2 | 9/2022 | Saue | |
| 11,512,011 B2 | 11/2022 | Huang et al. | |
| 11,512,012 B2 | 11/2022 | Chiang et al. | |
| 11,541,438 B2 | 1/2023 | Morrell | |
| 11,548,800 B2 | 1/2023 | Franceschi-Hofmann et al. | |
| 11,584,665 B2 | 2/2023 | Green et al. | |
| 11,623,884 B1 | 4/2023 | Menon et al. | |
| 11,643,339 B2 | 5/2023 | Nelson | |
| 11,679,999 B2 | 6/2023 | Newell et al. | |
| 11,713,261 B2 | 8/2023 | Griffis et al. | |
| 11,780,746 B2 | 10/2023 | Duckworth et al. | |
| 11,780,753 B2 | 10/2023 | Dejarme et al. | |
| 11,896,948 B2 | 2/2024 | Chang et al. | |
| 2001/0000485 A1 | 4/2001 | Ying et al. | |
| 2003/0168411 A1 | 9/2003 | Hiro et al. | |
| 2003/0226803 A1 | 12/2003 | Kamiya et al. | |
| 2004/0151957 A1 | 8/2004 | Brooks et al. | |
| 2004/0251212 A1 | 12/2004 | Ikematsu et al. | |
| 2005/0011765 A1 | 1/2005 | Omasa | |
| 2005/0173262 A1 | 8/2005 | Nakanishi et al. | |
| 2006/0000784 A1 | 1/2006 | Khudenko | |
| 2006/0096853 A1 | 5/2006 | King | |
| 2006/0254929 A1 | 11/2006 | Mikio | |
| 2009/0120863 A1 | 5/2009 | Salama et al. | |
| 2009/0282627 A1 | 11/2009 | Porat | |
| 2010/0000924 A1 | 1/2010 | Hayashi et al. | |
| 2010/0051477 A1 | 3/2010 | Jeon et al. | |
| 2010/0126879 A1 | 5/2010 | Wilman et al. | |
| 2011/0223523 A1 | 9/2011 | Lopez et al. | |
| 2012/0037498 A1 | 2/2012 | Pancurak et al. | |
| 2013/0162097 A1 | 6/2013 | Shinmoto et al. | |
| 2013/0180857 A1 | 7/2013 | Heffernan et al. | |
| 2013/0220919 A1 | 8/2013 | Bilbao et al. | |
| 2013/0277231 A1 | 10/2013 | Greenberg | |
| 2014/0327239 A1* | 11/2014 | Stanley .................. F16L 21/00 285/422 |
| 2015/0001094 A1 | 1/2015 | Beid et al. | |
| 2015/0151985 A1 | 6/2015 | Johnson et al. | |
| 2018/0141836 A1 | 5/2018 | Hu et al. | |
| 2019/0002321 A1 | 1/2019 | Grönfors et al. | |
| 2019/0092653 A1 | 3/2019 | Arbeus et al. | |
| 2020/0010341 A1 | 1/2020 | Harvey et al. | |
| 2020/0029714 A1 | 1/2020 | Nguyen et al. | |
| 2020/0165149 A1 | 5/2020 | Zhu et al. | |
| 2020/0270149 A1 | 8/2020 | Bejan et al. | |
| 2020/0325041 A1* | 10/2020 | Cosentino ........... C02F 1/46104 |
| 2020/0369547 A1 | 11/2020 | Davy et al. | |
| 2021/0147265 A1 | 5/2021 | Andrews et al. | |
| 2021/0179456 A1 | 6/2021 | Borras et al. | |
| 2021/0188666 A1 | 6/2021 | Borras et al. | |
| 2021/0221717 A1 | 7/2021 | Buschmann | |
| 2022/0073380 A1 | 3/2022 | Schneider et al. | |
| 2022/0081330 A1 | 3/2022 | Borras et al. | |
| 2022/0106208 A1 | 4/2022 | Borras et al. | |

(56) References Cited

U.S. PATENT DOCUMENTS

| | | |
|---|---|---|
| 2022/0315457 A1 | 10/2022 | Borras et al. |
| 2024/0010528 A1 | 1/2024 | Borras et al. |

FOREIGN PATENT DOCUMENTS

| | | |
|---|---|---|
| CA | 3140014 | 12/2020 |
| CA | 3140149 | 12/2020 |
| CN | 2099752 | 3/1992 |
| CN | 104291415 | 1/2015 |
| CN | 205692940 | 11/2016 |
| CN | 107235537 | 10/2017 |
| CN | 207330680 | 5/2018 |
| CN | 209636053 | 11/2019 |
| CN | 114502512 | 5/2022 |
| CN | 114555214 | 5/2022 |
| CN | 117203166 | 12/2023 |
| JP | S4988166 | 7/1974 |
| JP | S505669 | 3/1975 |
| JP | S5140380 | 4/1976 |
| JP | H10473 | 1/1998 |
| JP | H11277066 | 10/1999 |
| JP | 3072838 | 11/2000 |
| JP | 2001276849 | 10/2001 |
| JP | 2003225672 | 8/2003 |
| JP | 2004016868 | 1/2004 |
| JP | 2004066223 | 3/2004 |
| JP | 2005325437 | 11/2005 |
| JP | 2012011375 | 1/2012 |
| JP | 2022537699 | 8/2022 |
| JP | 2022538780 | 9/2022 |
| JP | 7237209 | 3/2023 |
| JP | 2024509544 | 3/2024 |
| JP | 7463409 | 4/2024 |
| PL | 224187 | 11/2016 |
| RU | 2029735 | 2/1995 |
| RU | 2142918 | 12/1999 |
| WO | 2000000670 | 1/2000 |
| WO | 2004046042 | 6/2004 |
| WO | 2008064460 | 6/2008 |
| WO | 2011107984 | 9/2011 |
| WO | 2012048425 | 4/2012 |
| WO | 2013016821 | 2/2013 |
| WO | 2013017901 | 2/2013 |
| WO | 2013075240 | 5/2013 |
| WO | 2014165998 | 10/2014 |
| WO | 2016024408 | 2/2016 |
| WO | 2016054749 | 4/2016 |
| WO | 2020247029 | 12/2020 |
| WO | 2020252241 | 12/2020 |
| WO | 2020252242 | 12/2020 |
| WO | 2022186877 | 9/2022 |
| WO | 2023114025 | 6/2023 |
| WO | 2023154555 | 8/2023 |
| WO | 2023205352 | 10/2023 |
| WO | 2023215271 | 11/2023 |
| WO | 2023244720 | 12/2023 |

OTHER PUBLICATIONS

"Application Serial No. 17 533,522, Non Final Office Action mailed Jun. 28, 2023", 28 pgs.
"Japanese Application Serial No. 2021-573824, Response filed Jul. 3, 2023 to Final Notification of Reasons for Refusal mailed Apr. 4, 2023", w English claims, 10 pgs.
"Canadian Application Serial No. 3,140,014, Examiners Rule 86(2) Report mailed Jul. 17, 2023", 3 pgs.
"Application Serial No. 17 838,361, Non Final Office Action mailed Aug. 7, 2023", 8 pgs.
"Chinese Application Serial No. 202080053751.3, Response filed Aug. 3, 2023 to Office Action mailed Mar. 9, 2023", w English claims, 11 pgs.
"Japanese Application Serial No. 2021-573824, Final Notification of Reasons for Refusal mailed Sep. 5, 2023", w English Translation, 14 pgs.
"International Application Serial No. PCT US2021 064124, International Preliminary Report on Patentability mailed Sep. 14, 2023", 9 pgs.
"Application Serial No. 17 533,522, Response filed Sep. 22, 2023 to Non Final Office Action mailed Jun. 28, 2023", 16 pgs.
"Application Serial No. 17 838,361, Response filed Sep. 22, 2023 to Non Final Office Action mailed Aug. 7, 2023", 13 pgs.
"International Application Serial No. PCT US2020 037405, International Search Report mailed Sep. 14, 2020", 2 pgs.
"International Application Serial No. PCT US2020 037405, Written Opinion mailed Sep. 14, 2020", 9 pgs.
"International Application Serial No. PCT US2020 037407, International Search Report mailed Sep. 16, 2020", 2 pgs.
"International Application Serial No. PCT US2020 037407, Written Opinion mailed Sep. 16, 2020", 8 pgs.
"Enpurion EC-Electrocoagulation", enpurion https: enpurion.com empurion-ec , (Accessed on Feb. 9, 2021), 4 pgs.
"U.S. Appl. No. 17/249,343, Restriction Requirement mailed Apr. 30, 2021", 7 pgs.
"U.S. Appl. No. 17/249,343, Response filed Jun. 7, 2021 to Restriction Requirement mailed Apr. 30, 2021", 10 pgs.
"U.S. Appl. No. 17/249,345, Restriction Requirement mailed May 3, 2021", 8 pgs.
"U.S. Appl. No. 17/249,345, Response filed Jun. 7, 2021 to Restriction Requirement mailed May 3, 2021", 11 pgs.
"U.S. Appl. No. 17/249,343, Non Final Office Action mailed Jun. 15, 2021", 17 pgs.
"U.S. Appl. No. 17/249,345, Non Final Office Action mailed Jun. 24, 2021", 26 pgs.
"U.S. Appl. No. 17/249,343, Response filed Sep. 7, 2021 to Non Final Office Action mailed Jun. 15, 2021", 21 pgs.
"U.S. Appl. No. 17/249,345, Response filed Sep. 7, 2021 to Non Final Office Action mailed Jun. 24, 2021", 19 pgs.
"U.S. Appl. No. 17/340,254, Non Final Office Action mailed Sep. 23, 2021", 10 pgs.
"U.S. Appl. No. 17/249,345, Notice of Allowance mailed Sep. 27, 2021", 12 pgs.
"U.S. Appl. No. 17/249,343, Final Office Action mailed Oct. 1, 2021", 16 pgs.
"U.S. Appl. No. 17/249,343, Response filed Nov. 4, 2021 to Final Office Action mailed Oct. 1, 2021", 15 pgs.
"U.S. Appl. No. 17/340,254, Response filed Nov. 4, 2021 to Non Final Office Action mailed Sep. 23, 2021", 15 pgs.
"U.S. Appl. No. 17/340,254, Final Office Action mailed Nov. 19, 2021", 10 pgs.
"U.S. Appl. No. 17/249,343, Notice of Allowance mailed Nov. 23, 2021", 10 pgs.
"U.S. Appl. No. 17/249,345, Corrected Notice of Allowability mailed Dec. 10, 2021", 4 pgs.
"U.S. Appl. No. 17/249,343, Corrected Notice of Allowability mailed Dec. 22, 2021", 3 pgs.
"International Application Serial No. PCT US2020 037405, International Preliminary Report on Patentability mailed Dec. 23, 2021", 11 pgs.
"International Application Serial No. PCT US2020 037407, International Preliminary Report on Patentability mailed Dec. 23, 2021", 10 pgs.
"U.S. Appl. No. 17/340,254, Response filed Jan. 5, 2022 to Final Office Action mailed Nov. 19, 2021", 14 pgs.
"U.S. Appl. No. 17/340,254, Advisory Action mailed Jan. 24, 2022", 3 pgs.
"U.S. Appl. No. 17/340,254, Response filed Feb. 21, 2022 to Advisory Action mailed Jan. 24, 2022", 18 pgs.
Al-Qodah, Zakaria, "Combined electrocoagulation processes as a novel approach for enhanced pollutants removal: a state-of-the-art review", Science of the Total Environment 744, (2020), 14 pgs.
Bensadok, K, "Electrocoagulation of cutting oil emulsions using aluminium plate electrodes", Journal of Hazardous Materials 152, (2008), 423-430.

(56) References Cited

OTHER PUBLICATIONS

Dina, T Moussa, "A comprehensive review of electrocoagulation for water treatment:Potentials and challenges", Journal of Environmental Management 186, (2017), 24-41.
Gobbi, Lorena C.A., "Electrocoagulation with polarity switch for fast oil removal from oil in water emulsions", Journal of Environmental Management 213, (2018), 119-125.
Govindan, Kadarkarai, "Electrocoagulants Characteristics and Application of Electrocoagulation for Micropollutant Removal and Transformation Mechanism", ACS Appl Mater. Interfaces 12, (2020), 1775-1788.
Jizhou, L, "Pretreatment of dyestuff wastewater by internal microelectrolysis", International Conference on Electric Technology and Civil Engineering, (2011), 4 pgs.
Kabdasli, I, "Electrocoagulation applications for industrial wastewaters: a critical review", Environmental Technology Reviews, (Nov. 6, 2012), 45 pgs.
Kekedy-Nagy, Laszlo, "Electroless Production of Fertilizer (Struvite) and Hydrogen from Synthetic Agricultural Wastewaters", Journal of the American Chemical Society J. Am. Chem. Soc 142, (2020), 15 pgs.
Kuokkanen, Ville, "Recent Applictions of Electrocoagulation in Treatment of Water and Wastewater-A Review", Green and Sustainable Chemistry, (Jan. 2013), 34 pgs.
Luba, Mateusz, "Electrochemical Degradation of Industrial Dyes in Wastewater through the Dissolution of Aluminum Sacrificial Anode of Cu Al Macro-Corrosion Galvanic Cell", Molecules (18) 4108, (Sep. 25, 2020), 17 pgs.
Peng, Shuai, "Iron-carbon galvanic cells strengthened anaerobic anoxic oxic process(Fe C-A20) for high-nitrogen phosphorus and low-carbon sewage treatment", Science of the Total Environment 722, (2020), 13 pgs.
Pierozynski, Boguslaw, "Electrochemical Degradation of Phenol and Resorcinol Molecules through the Dissolution of Sacrificial Anodes of Macro-Corrosion Galvanic Cells", Water 10:770, (2018), 10 pgs.
"U.S. Appl. No. 17/340,254, Notice of Allowance mailed Mar. 31, 2022", 7 pgs.
"European Application Serial No. 20821949.3, Response filed Mar. 31, 2022 to Communication Pursuant to Rules 161(1) and 162 EPC mailed", 11 pgs.
"U.S. Appl. No. 17/340,254, Notice of Allowability mailed Apr. 25, 2022", 3 pgs.
U.S. Appl. No. 17/249,343 U.S. Pat. No. 11,225,420, filed Feb. 26, 2021, Removal of Materials From Water.
U.S. Appl. No. 17/533,522, filed Nov. 23, 2021, Removal of Materials From Water.
U.S. Appl. No. 17/249,345 U.S. Pat. No. 11,220,443, filed Feb. 26, 2021, Removal of Phosphorus and Nitrogen From Water.
U.S. Appl. No. 17/340,254 U.S. Pat. No. 11,401,181, filed Jun. 7, 2021, Galvanic Process for Treating Aqueous Compositions.
U.S. Appl. No. 17/838,361, filed Jun. 13, 2022, Galvanic Process for Treating Aqueous Compositions.
U.S. Appl. No. 17/554,229, filed Dec. 17, 2021, Removal of Materials From Water.
"Canadian Application Serial No. 3,140,149, Examiners Rule 86(2) Requisition mailed Feb. 27, 2023", 3 pgs.
"Japanese Application Serial No. 2021-573824, Response filed Mar. 15, 2023 to Notification of Reasons for Refusal mailed Dec. 20, 2022", w English claims, 9 pgs.
"U.S. Appl. No. 17/533,522, Response filed Mar. 23, 2023 to Non Final Office Action mailed Jan. 26, 2023", 13 pgs.
"Australian Application Serial No. 2020291534, Response filed Mar. 23, 2023 to First Examination Report mailed Nov. 9, 2022", 10 pgs.
"International Application Serial No. PCT US2022 051651, International Search Report mailed Mar. 28, 2023", 2 pgs.
"International Application Serial No. PCT US2022 051651, Written Opinion mailed Mar. 28, 2023", 5 pgs.
"Japanese Application Serial No. 2021-573824, Final Notification of Reasons for Refusal mailed Apr. 4, 2023", w English Translation, 10 pgs.
"Chinese Application Serial No. 202080053751.3, Office Action mailed Mar. 9, 2023", W English Translation, 31 pgs.
"European Application Serial No. 20822476.6, Extended European Search Report mailed May 24, 2023", 10 pgs.
"European Application Serial No. 20821949.3, Extended European Search Report mailed May 24, 2023", 11 pgs.
Wei, V, "Nutrient removal in an electrically enhanced membrane Bioreactor", Water Science and Technology, vol. 60, No. 12, (Dec. 1, 2009), 3159-3163.
"Australian Application Serial No. 2020291534, First Examination Report mailed Nov. 9, 2022", 4 pgs.
"Canadian Application Serial No. 3,140,149, Response filed Dec. 15, 2022 to Office Action mailed Aug. 29, 2022", 34 pgs.
"Japanese Application Serial No. 2021-573824, Notification of Reasons for Refusal mailed Dec. 20, 2022", w English Translation, 11 pgs.
"Australian Application Serial No. 2020291450, Response filed Dec. 19, 2022 to First Examination Report mailed Oct. 28, 2022", 18 pgs.
"Japanese Application Serial No. 2021573769, Response filed Dec. 22, 2022 to Notification of Reasons for Refusal filed Oct. 4, 2022", w English claims, 14 pgs.
"Canadian Application Serial No. 3,140,014, Response filed Jan. 9, 2023 to Examiners Rule 86-2 Report mailed Sep. 20, 2022", 13 pgs.
"U.S. Appl. No. 17/247,103, Non Final Office Action mailed Jan. 26, 2023", 16 pgs.
"Canadian Application Serial No. 3,140,014, Response filed Oct. 25, 2023 to Examiners Rule 86(2) Report mailed Jul. 17, 2023", 25 pgs.
"U.S. Appl. No. 17/838,361, Final Office Action mailed Oct. 31, 2023", 11 pgs.
"Chinese Application Serial No. 202080053751.3, Office Action mailed Sep. 14, 2023", w English Translation, 26 pgs.
"Ship Corrosion Protection Technology", Ha'erbin: Harbin Engineering University Press Abstract with English Translation, (Feb. 28, 2011), 10 pgs.
"Japanese Application Serial No. 2021-573824, Response filed Dec. 1, 2023 to Final Notification of Reasons for Refusal mailed Sep. 5, 2023", w English Claims, 9 pgs.
"International Application Serial No. PCT US2021 064124, International Search Report mailed Aug. 17, 2022", 2 pgs.
"International Application Serial No. PCT US2021 064124, Written Opinion mailed Aug. 17, 2022", 7 pgs.
"Canadian Application Serial No. 3, 140,149, Office Action mailed Aug. 29, 2022", 3 pgs.
"European Application Serial No. 20822476.6, Response to Communication pursuant to Rules 161(2) and 162 EPC filed Sep. 1, 2022", 24 pgs.
"Canadian Application Serial No. 3,140,014, Examiners Rule 86-2 Report mailed Sep. 20, 2022", 5 pgs.
"Japanese Application Serial No. 2021573769, Notification of Reasons for Refusal filed Oct. 4, 2022", w English Translation, 6 pgs.
"Australian Application Serial No. 2020291450, First Examination Report mailed Oct. 28, 2022", 3 pgs.
"U.S. Appl. No. 17/533,522, Response filed Apr. 23, 2024 to Advisory Action mailed Mar. 8, 2024", 21 pgs.
"U.S. Appl. No. 17/838,361, Non Final Office Action mailed Apr. 24, 2024", 7 pgs.
"Chinese Application Serial No. 202180097592.1, Office Action mailed Apr. 2, 2024", W English Translation, 22 pgs.
"Canadian Application Serial No. 3,208,736, Examiners Rule 86(2) Requisition mailed May 6, 2024", 5 pgs.
"Canadian Application Serial No. 3,140,014, Response filed May 27, 2024 to Examiners Rule 86(2) Report mailed Feb. 9, 2024", 25 pgs.
"U.S. Appl. No. 17/838,361, Response filed Jun. 5, 2024 to Final Office Action mailed Apr. 24, 2024", 7 pgs.
"Canadian Application Serial No. 3,140,149, Response filed Jun. 7, 2024 to Examiners Rule 86(2) Report mailed Mar. 13, 2024", 38 pgs.

(56) References Cited

OTHER PUBLICATIONS

"U.S. Appl. No. 18/628,020, Notice of Allowance mailed Jun. 20, 2024", 9 pgs.

"International Application Serial No. PCT US2022 051651, International Preliminary Report on Patentability mailed Jun. 27, 2024", 7 pgs.

"U.S. Appl. No. 18/628,020, Supplemental Notice of Allowability mailed Jul. 5, 2024", 2 pgs.

"Chinese Application Serial No. 202080053739.2, Office Action mailed Jun. 13, 2024", W English Translation, 11 pgs.

"Chinese Application Serial No. 202080053739.2, Office Action mailed Nov. 29, 2023", w English Translation, 27 pgs.

"Chinese Application Serial No. 202080053751.3, Response filed Dec. 26, 2023 to Office Action mailed Sep. 14, 2023", w English claims, 13 pgs.

"U.S. Appl. No. 17/838,361, Response filed Jan. 24, 2024 to Final Office Action mailed Oct. 31, 2023", 16 pgs.

"Canadian Application Serial No. 3,140,014, Examiners Rule 86(2) Report mailed Feb. 9, 2024", 4 pgs.

"U.S. Appl. No. 17/533,522, Response filed Feb. 23, 2024 to Final Office Action mailed Dec. 26, 2023", 18 pgs.

"U.S. Appl. No. 17/533,522, Advisory Action mailed Mar. 8, 2024", 4 pgs.

"Canadian Application Serial No. 3,140,149, Examiners Rule 86(2) Report mailed Mar. 13, 2024", 7 pgs.

"Chinese Application Serial No. 202080053751.3, Office Action mailed Feb. 27, 2024", w English translation, 29 pgs.

"Australian Application Serial No. 2021430769, First Examination Report mailed Mar. 22, 2024", 3 pgs.

"Canadian Application Serial No. 3208736, Voluntary Amendment filed Mar. 18, 2024" 7 pgs.

"International Application Serial No. PCT US2023 019295, International Search Report mailed Jul. 21, 2023", 2 pgs.

"International Application Serial No. PCT US2023 019295, Written Opinion mailed Jul. 21, 2023", 9 pgs.

"International Application Serial No. PCT US2023 025390, International Search Report mailed Sep. 20, 2023", 2 pgs.

"International Application Serial No. PCT US2023 025390, Written Opinion mailed Sep. 20, 2023", 6 pgs.

"Treatment Technologies for Per- and Polyfluoroalkyl Substances (PFAS)", Fact Sheet, (Sep. 2023), 4 pgs.

"European Application Serial No. 21929411.3, Response to Communication pursuant to Rules 161(2) and 162 EPC filed Apr. 5, 2024", 19 pgs.

Deng, Shubo, "Removal of perflurooctanoate from surface water by polyaluminium choloride coagulation", Water Research vol. 45 Issue 4 1774-1780, (Feb. 2011), 5 pgs.

Garg, Shafali, "Remediation of water from per- poly-fluoroalkyl substances (PFAS)—Challenges and perspectives", Journal of Environmental Chemical Engineering 9, (2021), 25 pgs.

Hubert, Michel, "Per- and polyfluoroalkyl substance (PFAS) removal from soil washing water by coagulation and flocculation", Water Research 249, (2023), 10 pgs.

Lu, Xinyu, "Adsorption behavior and mechanism of perfluorooctane sulfonate on nanosized inorganic oxides", Journal of Colloid and Interface Science vol. 474 pp. 199-205, (Jul. 15, 2016), 6 pgs.

Malik, Qasim H, "Performance of alum and assorted coagulants in turbidity removal of muddy water", Applied Water Science, (2018), 4 pgs.

Merino, Nancy, "Degradation and Removal Methods for Perfluoroalky and Polyfluoroalkyl Substances in Water", Environmental Engineering Science vol. 33, No. 9, (Sep. 1, 2016), 60 pgs.

Xiao, Feng, "Mechanisms for removal of perfluorooctane sulfonate (PFOS) and perfluorooctanoate (PFOA) from drinking water by conventional enhances coagulation", Water Research vol. 47, Issue 1 pp. 49-56, (Jan. 1, 2013), 6 pgs.

Zhang, D Q, "Adsorption of perfluoroalkyl and polyfluoroalkyl substances (PFASs) from aqueous solution—A review", Science of the Total Environment 694, (2019), 19 pgs.

Zhang, Mingkun, "Aluminum-based electrocoagulation for residual fluoride removal during per-and polyfluoroalkyl substances (PFASs) wastewater treatment", Separation and Purification Technology vol. 308, (Mar. 2023), 7 pgs.

Zhang, Zhiming, "Adsorption of perfluorooctanoic acid (PFOA) and perfluorooctanesulfonic acid (PFOS) by aluminum-based drinking water treatment residuals", Journal of Hazardous Materials Letters, (2021), 6 pgs.

"European Application Serial No. 20821949.3, Response filed Dec. 5, 2023 to Extended European Search Report mailed May 24, 2023", 18 pgs.

"European Application Serial No. 20822476.6, Response filed Dec. 5, 2023 to Extended European Search Report mailed May 24, 2023", 18 pgs.

"U.S. Appl. No. 17/533,522, Final Office Action mailed Dec. 26, 2023", 30 pgs.

"Japanese Application Serial No. 2023-553408, Notification of Reasons for Rejection mailed Jul. 23, 2024", W English Translation, 10 pgs.

"Chinese Application Serial No. 202180097592.1, Response filed Aug. 1, 2024 to Office Action mailed Apr. 2, 2024", w current English claims, 8 pgs.

"Canadian Application Serial No. 3,208,736, Response filed Aug. 12, 2024 to Examiners Rule 86(2) Requisition mailed May 6, 2024", 17 pgs.

"Chinese Application Serial No. 202080053739.2, Response filed Aug. 13, 2024 to Office Action mailed Jun. 13, 2024", w English claims, 11 pgs.

"European Application Serial No. 21929411.3, Communication pursuant to Rule 164(1) EPC mailed Sep. 11, 2024", 18 pgs.

"U.S. Appl. No. 17/533,522, Non Final Office Action mailed Jul. 10, 2024", 28 pgs.

"U.S. Appl. No. 17/838,361, Notice of Allowance mailed Aug. 16, 2024", 8 pgs.

"U.S. Appl. No. 18/371,603, Non Final Office Action mailed Aug. 27, 2024", 14 pgs.

"U.S. Appl. No. 17/838,361, Notice of Allowability mailed Aug. 30, 2024", 3 pgs.

"U.S. Appl. No. 17/554,229, Non Final Office Action mailed Sep. 18, 2024", 15 pgs.

\* cited by examiner

SYSTEM FOR REMOVAL OF PHOSPHORUS AND NITROGEN FROM WATER

CROSS-REFERENCE TO RELATED APPLICATION

This application is a divisional of U.S. patent application Ser. No. 17/249,345, filed Feb. 26, 2021, which application is a continuation of International Application No. PCT/US2020/037407, filed Jun. 12, 2020, which claims the benefit of priority to U.S. Provisional Patent Application Ser. No. 62/860,433 filed Jun. 12, 2019, the disclosure of each of which is incorporated herein in their entireties by reference.

BACKGROUND

Phosphorus is a common constituent of agricultural fertilizers, manure, and organic wastes in sewage and industrial effluent. It is an essential element for plant life, but when there is too much of it in water, it can cause growth of plants and algae and deplete oxygen from the water at a rate that is greater than ecosystems can handle and can have severe ecological effects including toxic algae blooms, death of native aquatic species, and loss of biodiversity (eutrophication). Although various methods for removal of phosphorus from water are available, existing methods can be expensive, inconvenient, inefficient, lack scalability, or can be environmentally unfriendly.

Nitrogen is a common constituent of agricultural fertilizers, manure, and organic wastes in sewage and industrial effluent. It is an essential element for plant life. However, when there is too much nitrogen in water, it can cause growth of plants and algae and can deplete oxygen from the water at a rate that is greater than ecosystems can handle, causing severe ecological effects including toxic algae blooms, death of native aquatic species, and loss of biodiversity (eutrophication). Simple particulate removal processes such as filtration will remove particulates and lower the total nitrogen concentration; however, these processes will not lower the concentration of water-soluble forms of nitrogen. Although various methods for removal of soluble nitrogen from water are available, these methods are expensive, complex, and difficult to control.

SUMMARY OF THE INVENTION

In various embodiments, the present invention provides a method of removing phosphorus and nitrogen from water. The method includes passing starting material water including nitrogen and phosphorus through an elevated pH phosphorus removal stage. The elevated pH phosphorus removal stage includes raising pH of the water to greater than or equal to 7.5 to precipitate a phosphorus salt from the water. The elevated pH phosphorus removal stage also includes removing the precipitated phosphorus salt from the water. The method include passing the water through an electrolytic nitrogen removal stage including passing the water through an electrolytic cell to remove nitrogen from the water as nitrogen gas. The method also includes passing the water through a galvanic phosphorus removal stage including immersing a galvanic cell in the water to form treated water including a salt that includes phosphorus from the water. The galvanic cell includes an anode including Mg, Al, Fe, Zn, or a combination thereof, and a cathode having a different composition than the anode, the cathode including Cu, Ni, Fe, or a combination thereof. The galvanic phosphorus removal stage also includes separating the salt including the phosphorus from the treated water. The water produced by the method has a lower phosphorus concentration and a lower nitrogen concentration than the starting material water.

In various embodiments, the present invention provides a method of removing phosphorus and nitrogen from water. The method includes passing starting material water including nitrogen and phosphorus through an elevated pH phosphorus removal stage. The elevated pH phosphorus removal stage includes raising pH of the water using one or more bases to 8.5 to 9.5 to precipitate a phosphorus salt from the water including struvite, calcium phosphate, or a combination thereof. The elevated pH phosphorus removal stage also includes removing the precipitated phosphorus salt from the water. The elevated pH phosphorus removal stage removes 90-98% of reactive phosphorus in the water. The method includes passing the water through an electrolytic nitrogen removal stage including passing the water through an electrolytic cell to remove nitrogen from the water as nitrogen gas. The electrolytic cell includes a cathode including stainless steel and an anode that includes titanium oxide, ruthenium oxide, and iridium oxide supported on titanium ($TiO_2$—$RuO_2$—$IrO_2$/Ti). Passing the water through the electrolytic nitrogen removal stage removes 80-100% of ammonia from the water. The method also includes passing the water through a galvanic phosphorus removal stage including immersing a galvanic cell in the water to form treated water including a salt that includes phosphorus from the water. The salt includes $AlPO_4$ or a hydrate thereof, the $AlPO_4$ including the phosphorus and Al from the anode; aluminum hydroxide or a hydrate thereof, the aluminum hydroxide including Al from the anode; or a combination thereof. The galvanic cell includes an anode including Al, wherein the anode is about 90 wt % to about 100 wt % Al. The galvanic cell includes a cathode including Cu, wherein the cathode is about 90 wt % to about 100 wt % Cu. The galvanic cell also includes a conductive connector that electrically connects the anode and the cathode, the conductive connector including an alloy including Cu and Zn. The galvanic phosphorus removal stage also includes separating the salt including the phosphorus from the treated water. The water produced by the method has a lower phosphorus concentration and a lower nitrogen concentration than the starting material water. The water produced by the method has a total phosphorus concentration of about 0.0001 ppm to 0.05 ppm, and a total nitrogen concentration of about 0 ppm to about 1 ppm.

In various embodiments, the present invention provides a method of removing nitrogen from water. The method includes passing the water through an electrolytic cell to remove nitrogen from the water as nitrogen gas.

In various embodiments, the present invention provides a method of removing nitrogen from water. The method includes passing the water through an electrolytic cell to remove nitrogen from the water as nitrogen gas. The electrolytic cell includes a cathode including stainless steel and an anode including titanium oxide, ruthenium oxide, and iridium oxide supported on titanium ($TiO_2$—$RuO_2$—$IrO_2$/Ti); or titanium oxide and ruthenium oxide supported on titanium ($TiO_2$—$RuO_2$/Ti); or titanium and platinum (Ti—Pt); or a combination thereof. The removal of nitrogen as nitrogen gas removes 80-100% of ammonia from the water.

In various embodiments, the present invention provides a system for removal of nitrogen and phosphorus from water. The system includes an elevated pH phosphorus removal stage configured to raise pH of starting material water to greater than or equal to 7.5 to precipitate a phosphorus salt from the water and configured to remove the precipitated phosphorus salt from the water. The system includes an electrolytic nitrogen removal stage including an electrolytic cell configured to remove nitrogen from the water as nitrogen gas. The system includes a galvanic phosphorus removal stage including a galvanic cell including an anode including Mg, Al, Fe, Zn, or a combination thereof, and a cathode having a different composition than the anode, the cathode including Cu, Ni, Fe, or a combination thereof, the galvanic cell configured to form a treated water including a salt that includes phosphorus from the water, wherein the galvanic phosphorus removal stage is configured to separate the salt including the phosphorus from the treated water. The water produced by the system has a lower phosphorus concentration and a lower nitrogen concentration than the starting material water.

In various embodiments, the present invention provides an apparatus for removal of nitrogen from water. The apparatus includes an electrolytic cell through which water is configured to be flowed to remove nitrogen from the water as nitrogen gas. The electrolytic cell includes a cathode includes stainless steel and/or titanium and an anode comprising titanium oxide, ruthenium oxide, and iridium oxide supported on titanium ($TiO_2$—$RuO_2$—$IrO_2$/Ti); or titanium oxide and ruthenium oxide supported on titanium ($TiO_2$—$RuO_2$/Ti); or titanium and platinum (Ti—Pt); or a combination thereof. The removal of nitrogen as nitrogen gas removes 80-100% of ammonia from the water.

In various embodiments, the method of phosphorus and/or nitrogen removal of the present invention has certain advantages over other methods of removal phosphorus from water. For example, in some embodiments, the method of phosphorus and/and nitrogen removal of the present invention can remove a larger amount of phosphorus and/or nitrogen, accomplish a lower concentration of phosphorus and/or nitrogen, achieve phosphorus and/or nitrogen removal with greater efficiency or less cost, utilize a smaller footprint, or a combination thereof, as compared to other methods.

In various embodiments, the method of phosphorus and/or nitrogen removal of the present invention can be performed with less oxidation of incoming water as compared to other methods, or with no oxidation of incoming water. In some embodiments that include a galvanic cell including an anode that includes Al, a higher pH near that anode from production of hydroxide ions can induce or enhance precipitation of the aluminum salt (e.g., $AlPO_4$, aluminum hydroxide, or a combination thereof). In some embodiments, the ratio of Al to P used to remove the phosphorus from the water is lower than those reported by other methods, such as methods using an addition of an aluminum salt.

BRIEF DESCRIPTION OF THE FIGURES

The drawings illustrate generally, by way of example, but not by way of limitation, various embodiments of the present invention.

DETAILED DESCRIPTION OF THE INVENTION

Figure 1A:
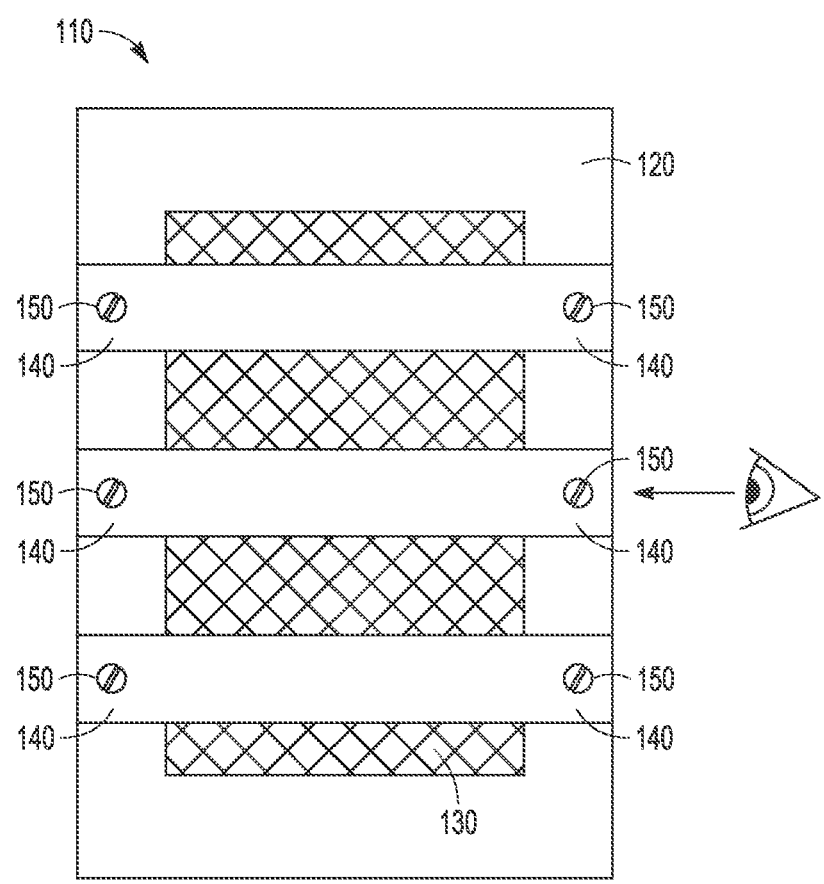
FIG. 1A illustrates an electrochemical cell view from a major face, in accordance with various embodiments.

Reference will now be made in detail to certain embodiments of the disclosed subject matter. While the disclosed subject matter will be described in conjunction with the enumerated claims, it will be understood that the exemplified subject matter is not intended to limit the claims to the disclosed subject matter.

Throughout this document, values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" or "at least one of A or B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section.

In the methods described herein, the acts can be carried out in any order without departing from the principles of the invention, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

The term "about" as used herein can allow for a degree of variability in a value or range, for example, within 10%, within 5%, or within 1% of a stated value or of a stated limit of a range, and includes the exact stated value or range. The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more, or 100%. The term "substantially free of" as used herein can mean having none or having a trivial amount of, such that the amount of material present does not affect the material properties of the composition including the material, such that about 0 wt % to about 5 wt % of the composition is the material, or about 0 wt % to about 1 wt %, or about 5 wt % or less, or less than or equal to about 4.5 wt %, 4, 3.5, 3, 2.5, 2, 1.5, 1, 0.9, 0.8, 0.7, 0.6, 0.5, 0.4, 0.3, 0.2, 0.1, 0.01, or about 0.001 wt % or less, or about 0 wt %.

In various embodiments, salts having a positively charged counterion can include any suitable positively charged counterion. For example, the counterion can be ammonium ($NH_4^+$), or an alkali metal such as sodium ($Na^+$), potassium ($K^+$), or lithium ($Li^+$). In some embodiments, the counterion can have a positive charge greater than +1, which can in some embodiments complex to multiple ionized groups, such as $Zn^{2+}$, $Al^{3+}$, or alkaline earth metals such as $Ca^{2+}$ or $Mg^{2+}$.

All concentrations of phosphorus, nitrogen, chloride, ammonia, magnesium, and aluminum referred to are dissolved concentrations of these materials in elemental or non-elemental (e.g., as a compound or ion including the material) forms, unless otherwise indicated. All concentrations given herein are by weight unless otherwise indicated.

As used herein, "total phosphorus concentration" refers to the concentration of all forms of phosphorus, as measured by US-EPA 365.1: Determination of Phosphorus by Semi-Automated Colorimetry or equivalent, unless otherwise indicated.

As used herein, "dissolved phosphorus concentration" refers to the concentration of all forms of phosphorus passable though a 0.45 micron filter and as measured by US-EPA 365.1: Determination of Phosphorus by Semi-Automated Colorimetry or equivalent, unless otherwise indicated.

As used herein, "reactive phosphorus concentration" refers to the soluble reactive phosphorus in solution (e.g., orthophosphate) as measured by US-EPA 365.1: Determination of Phosphorus by Semi-Automated Colorimetry or equivalent unless otherwise indicated.

Method of Removing Phosphorus and Nitrogen from Water.

Various embodiments of the present invention provide a method of removing phosphorus and nitrogen from water. The method can include passing starting material water including nitrogen and phosphorus through an elevated pH phosphorus removal stage. The elevated pH phosphorus removal stage can include raising pH of the water to greater than or equal to 7.5 to precipitate a phosphorus salt from the water, and removing the precipitated phosphorus salt from the water. The method can include passing the water through an electrolytic nitrogen removal stage that includes passing the water through an electrolytic cell to remove nitrogen from the water as nitrogen gas. The method can also include passing the water through a galvanic phosphorus removal stage that includes immersing a galvanic cell in the water to form treated water including a salt that includes phosphorus from the water. The galvanic cell can include an anode including Mg, Al, Fe, Zn, or a combination thereof, and a cathode having a different composition than the anode, the cathode including Cu, Ni, Fe, or a combination thereof. The galvanic phosphorus removal stage can include separating the salt including the phosphorus from the treated water. The water produced by the method can have a lower phosphorus concentration and a lower nitrogen concentration than the starting material water (e.g., lower dissolved phosphorus/nitrogen concentration).

The water can flow from the elevated pH phosphorus removal stage to the electrolytic nitrogen removal stage. The water can flow from the electrolytic nitrogen removal stage to the galvanic phosphorus removal stage. The water produced by the galvanic phosphorus removal stage can be the final water product of the method, or the water can flow from the galvanic phosphorus removal stage to an optional further removal of nitrogen stage. The method can optionally include one or more intervening steps between any one or more stages; in some embodiments, the method includes one or more intervening steps, while in other embodiments, the method is substantially free of intervening steps between the elevated pH phosphorus removal stage and the electrolytic nitrogen removal stage, between the electrolytic nitrogen removal stage and the galvanic phosphorus removal stage, between the galvanic phosphorus removal stage and the optional further removal of nitrogen stage, or a combination thereof.

The starting material water can be taken from any suitable source, such as a natural source of water in the environment, drinking water (e.g., for removal of struvite to prevent formation in pipes), industrial waste-water, industrial cooling water, or a combination thereof. The water can be water taken from a source including a natural source of water in the 5 environment, such as a pond, lake, river, stream, and the like. In some embodiments, the method can include taking the water from the source, returning the water to the source after removal of nitrogen and phosphorus, or a combination thereof. The starting material water can be a product of fertilizer production or mining. For example, the starting material water can be water taken from a phosphate mine reservoir, such as water originated from a process of dissolving phosphate-containing rock to produce phosphoric acid.

The starting material water can have any suitable pH, such as a pH of less than 7.5, or 1 to less than 7.5, or 2-6, 4-5, or 1 or more but less than 7.5, or less than, equal to, or greater than 1.5, 2, 2.5, 3, 3.5, 4, 4.5, 5, 5.5, 6, 6.5, 7, or 7.5 or less.

The phosphorus in the starting material water can be in any suitable form, such as elemental phosphorus, inorganic phosphorus, organic phosphorus, a dissolved form of phosphorus, a solid form of phosphorus, oxidized phosphorus, or a combination thereof.

The nitrogen in the water can be in any suitable form, such as in the form of elemental nitrogen, inorganic nitrogen, organic nitrogen, a dissolved form of nitrogen, a solid form of nitrogen, oxidized nitrogen, or a combination thereof.

The starting material water can have any suitable ammonia concentration, such as 50 ppm to 5,000 ppm, 150 ppm to 400 ppm, or 50 ppm or more, or less than, equal to, or greater than 100 ppm, 150, 200, 250, 300, 350, 400, 450, 500, 600, 750, 1,000, 2,000, 3,000, 4,000, or 5,000 ppm or less.

The starting material water can have any suitable reactive phosphorus concentration, such as 10 ppm to 10,000 ppm, 50 ppm to 400 ppm, or 10 ppm or more, or less than, equal to, or greater than 25 ppm, 50, 100, 150, 200, 250, 300, 350, 400, 500, 750, 1,000, 2,000, 4,000, 6,000, 8,000, or 10,000 ppm or less.

The starting material water can have any suitable sodium concentration, such as 50 ppm to 20,000 ppm, 400 ppm to 5,000 ppm, or 50 ppm or more, or less than, equal to, or greater than 100 ppm, 200, 400, 600, 800, 1,000, 1,500, 2,000, 2,500, 3,000, 3,500, 4,000, 4,500, 5,000, 7,500, 10,000, 12,500, 15,000, 17,500, or 20,000 ppm or less.

The starting material water can have any suitable magnesium concentration, such as 10 ppm to 10,000 ppm, 50 ppm to 600 ppm, or 10 ppm or more, or less than, equal to, or greater than 50 ppm, 100, 200, 300, 400, 500, 600, 700, 800, 1,000, 2,000, 4,000, 6,000, 8,000, or 10,000 ppm or less.

The starting material water can have any suitable chloride concentration, such as 50 ppm to 40,000 ppm, 200 ppm to 10,000 ppm, or 50 ppm or more, or less than, equal to, or greater than 100 ppm, 200, 500, 1,000, 2,000, 4,000, 6,000, 8,000, 10,000, 15,000, 20,000, 30,000, or 40,000 ppm or less.

The water produced by the method can have a total phosphorus concentration, a dissolved phosphorus concentration, a reactive phosphorus concentration, or a combination thereof, of about 0 ppm to about 1 ppm, about 0.0001 ppm to 0.1 ppm, about 0.0001 ppm to 0.05 ppm, or about 0 ppm, or less than, equal to, or greater than about 0.0001 ppm, 0.0002, 0.0004, 0.0006, 0.0008, 0.0010, 0.0012, 0.0014, 0.0016, 0.0018, 0.0020, 0.0022, 0.0024, 0.0026, 0.0028, 0.0030, 0.0032, 0.0034, 0.0036, 0.0038, 0.0040, 0.0045, 0.0050, 0.0060, 0.0080, 0.01, 0.02, 0.04, 0.06, 0.08, 0.1, 0.2, 0.4, 0.6, 0.8, or about 1.0 ppm or more. The water produced by the method can have a total phosphorus concentration, a dissolved phosphorus concentration, a reactive phosphorus concentration, or a combination thereof, that is about 0% to 70% of the respective total phosphorus concentration, a dissolved phosphorus concentration, a reactive phosphorus concentration, or a combination thereof, of the starting material water, or about 0% to about 20%, or about 0%, or less than, equal to, or greater than about 0.001%, 0.005, 0.01, 0.05, 0.1, 0.5, 1, 2, 4, 6, 8, 10, 15, 20, 25, 30, 35, 40, 45, 50, 55, 60, 65, or about 70% or more.

The water produced by the method can have any suitable total nitrogen concentration, dissolved nitrogen concentration, or a combination thereof, such as 0 ppm to about 2 ppm, 0 ppm to about 1 ppm, or about 0 ppm, or less than, equal to, or greater than 0.001 ppm, 0.0012, 0.0014, 0.0016, 0.0018, 0.0020, 0.0022, 0.0024, 0.0026, 0.0028, 0.0030, 0.0032, 0.0034, 0.0036, 0.0038, 0.0040, 0.0045, 0.0050, 0.0060, 0.0080, 0.01, 0.02, 0.04, 0.06, 0.08, 0.1, 0.2, 0.4, 0.6, 0.8, 1, 1.1, 1.2, 1.4, 1.6, 1.8, or about 2 ppm or less. The water produced by the method can have a total nitrogen concentration, a dissolved nitrogen concentration, or a combination thereof, that is about 0% to about 70% of the respective total nitrogen concentration, dissolved nitrogen concentration, or a combination thereof, of the starting material water, or about 0% to about 30%, or about 0%, or less than, equal to, or greater than about 0.001%, 0.005, 0.01, 0.05, 0.1, 0.5, 1, 2, 4, 6, 8, 10, 15, 20, 25, 30, 35, 40, 45, 50, 55, 60, 65, or about 70% or more.

Elevated pH Phosphorus Removal Stage.

The method of removing phosphorus and nitrogen can include passing the water through an elevated pH phosphorus removal stage. The elevated pH phosphorus removal stage The elevated pH phosphorus removal stage can include raising pH of the water to greater than or equal to 7.5 to precipitate a phosphorus salt from the water, and removing the precipitated phosphorus salt from the water.

Raising the pH of the water to precipitate the phosphorus salt from the water can include raising the pH of the water to any suitable level to induce a suitable amount of precipitation of the phosphorus salt to occur. Raising the pH of the water to precipitate the phosphorus salt can include raising the pH of the water to 7.5 to 12, 8.5 to 9.5, or 7.5 or more, or less than, equal to, or greater than 8, 8.5, 9, 9.5, 10, 10.5, 11, 11.5, or 12 or less. Raising the pH of the water to precipitate the phosphorus salt from the water can include adding one or more bases to the water, such as any suitable one or more bases, such as NaOH, KOH, or a combination thereof. In various aspects, the method includes adding NaOH to the water, such as 5% aqueous NaOH.

The precipitation can occur without aid of other materials, or the precipitation can occur in the presence of one or more added flocculants. The flocculant can be any suitable flocculant, such as an anionic, cationic, or nonionic flocculant, a metal salt coagulant, a starch-based flocculant, or a combination thereof. The flocculant can be an anionic polymer flocculant.

The removal of the precipitated phosphorus salt can be performed in any suitable way such that the precipitate is separated from the water. Removing the precipitated phosphorus salt from the water can include decantation, settling, filtration, or a combination thereof.

The precipitated phosphorus salt can include any suitable one or more phosphorus salts. The composition of the one or more precipitated phosphorus salts can depend on the composition of the starting material water. The precipitated phosphorus salt can include struvite, calcium phosphate, or a combination thereof.

The elevated pH phosphorus removal stage can remove any suitable amount of phosphorus from the water. For example, the elevated pH phosphorus removal stage can remove 70-100% of the reactive phosphorus in the water, 90-98%, or 70% or more, or less than, equal to, or greater than 72%, 74, 76, 78, 80, 81, 82, 83, 84, 85, 86, 87, 88, 89, 90, 91, 92, 93, 94, 95, 96, 97, 98, 99, 99.9, or 99.99% or less.

The elevated phosphorus removal stage can optionally remove ammonia from the water. The elevated phosphorus removal stage can remove any suitable amount of ammonia from the water, such as 0-60%, 20-30%, or 0%, or less than, equal to, or greater than 10%, 20, 25, 30, 35, 40, 45, 50, 55, or 60% or less.

Electrolytic Nitrogen Removal Stage.

The method of removing phosphorus and nitrogen can include passing the water through an electrolytic nitrogen removal stage that includes passing the water through an electrolytic cell to remove nitrogen from the water as nitrogen gas.

The electrolytic nitrogen removal stage can include passing the water through one electrolytic cell or multiple electrolytic cells. Passing the water through the electrolytic cell can include allowing the water to contact the anode and can include allowing the water to pass between the anode and the cathode. The electrolytic cell can be partially or fully submerged/immersed in the water. Shear can be applied to the water as it is passed through the electrolytic cell, to increase exposure of the water to the cathode and anode surfaces.

Prior to passing through the electrolytic cell, the water can have any suitable chloride concentration, such as 50 ppm to 40,000 ppm, 200 ppm to 10,000 ppm, or or 50 ppm or more, or less than, equal to, or greater than 100 ppm, 200, 500, 1,000, 2,000, 4,000, 6,000, 8,000, 10,000, 15,000, 20,000, 30,000, or 40,000 ppm or less.

The water immersing the electrolytic cell can have any suitable pH, such as a pH of 6 to 12, 6 to 7, or 6 or more, or less than, equal to, or greater than 6.5, 7, 7.5, 8, 8.5, 9, 9.5, 10, 10.5, 11, 11.5, or 12 or less. The method can include adding one or more bases to the water to regulate or maintain the pH of the water, such as sodium hydroxide; in other embodiments, the method is free of adding acids or bases to the water to maintain or regulate the pH thereof.

The electrolytic cell can be operated in any suitable way to remove nitrogen as nitrogen gas from the water. The cell can be operated with DC current or AC current. The electrolytic cell can be operated with any suitable current density, such as 0.001-0.1 A/cm$^2$, 0.02-0.04 A/cm$^2$, or 0.001 A/cm$^2$ or more, or less than, equal to, or greater than 0.005, 0.01, 0.015, 0.02, 0.025, 0.03, 0.035, 0.04, 0.045, 0.05, 0.06, 0.07, 0.08, 0.09, or 0.1 A/cm$^2$ or less.

The electrolytic cell includes an anode. The anode can include titanium oxide, ruthenium oxide, and iridium oxide supported on titanium ($TiO_2$—$RuO_2$—$IrO_2$/Ti); or titanium oxide and ruthenium oxide supported on titanium ($TiO_2$—$RuO_2$/Ti); or titanium and platinum (Ti—Pt); or a combination thereof. The anode and cathode materials can be selected such that the electrodes favor the formation of chlorine gas to form hypochlorite during operation of the electrolytic cell.

The electrolytic cell includes a cathode. The cathode can include titanium, stainless steel, or a combination thereof. The cathode can include stainless steel.

The electrolytic cell can include a spacing between the anode and cathode, such as a spacing of 0.5-8 mm, 2-4 mm, or 0.5 mm or more, or less than, equal to, or greater than 1 mm, 1.5, 2, 2.5, 3, 3.5, 4, 4.5, 5, 6, 7, or 8 mm or less.

The method is not limited to any particular mechanism of removing nitrogen from the water as ammonia using the electrolytic cell. The removing of nitrogen as nitrogen gas can include converting ammonia in the water to nitrogen gas using the electrolytic cell. Passing the water through the electrolytic nitrogen removal stage can produce hypochlorite in the water which can react with ammonia in the water to form the nitrogen gas, which can be released to the environment. The reaction can take place via $NH_4^+ + 1.5\ HOCl \rightarrow 0.5 N_2 + 1.5 H_2O + 2.5 H^+ + 1.5\ Cl^-$. The electrolytic cell can produce any suitable hypochlorite concentration in the water being passed therethrough, such as 100-20,000 ppm hypochlorite, 2000-2500 ppm, or 100 ppm or more, or less than, equal to, or greater than 200 ppm, 400, 600, 800, 1,000, 1,200, 1,400, 1,600, 1,800, 2,000, 2,100, 2,200, 2,300, 2,400, 2,500, 2,600, 2,800, 3,000, 4,000, 6,000, 8,000, 10,000, 15,000, or 20,000 ppm or less.

The electrolytic nitrogen removal stage can remove any suitable amount of nitrogen from the water. For example, passing the water through the electrolytic nitrogen removal stage can remove 80% to 100% of ammonia from the water, 99-100%, or 80% or more, or less than, equal to, or greater than 81%, 82, 83, 84, 85, 86, 87, 88, 89, 90, 91, 92, 93, 94, 95, 96, 97, 98, 99, 99.9, 99.99, or 99.999% or less.

In various embodiments, the electrolytic nitrogen removal stage can also include removing phosphorus from the water, such as any suitable amount of phosphorus. For example, passing the water through the electrolytic nitrogen removal stage can remove 0.1 to 90% of reactive phosphorus from the water, or 1-30%, or 0.1% or more, or less than, equal to, or greater than 2%, 4, 6, 8, 10, 12, 14, 16, 18, 20, 22, 24, 26, 28, 30, 40, 50, 60, 70, 80, or 90% or less.

Galvanic Phosphorus Removal Stage.

The method of removing nitrogen and phosphorus can also include passing the water through a galvanic phosphorus removal stage that includes immersing a galvanic cell in the water to form treated water including a salt that includes phosphorus from the water. The galvanic cell can include an anode including Mg, Al, Fe, Zn, or a combination thereof, and a cathode having a different composition than the anode, the cathode including Cu, Ni, Fe, or a combination thereof. The galvanic phosphorus removal stage can include separating the salt including the phosphorus from the treated water. The galvanic phosphorus removal stage is free of applying electrical potential (e.g., applied potential from a source external to the galvanic cell) across the anode and the cathode of the galvanic cell.

The galvanic phosphorus removal stage can reduce total phosphorus concentration of the water, dissolved phosphorus concentration of the water, reactive phosphorus concentration of the water, total nitrogen concentration of the water, a dissolved nitrogen concentration of the water, or a combination thereof, by any suitable amount, such as 70% to 100%, 80% to 100%, 90% to 100%, or 70% or more, or less than, equal to, or greater than 71%, 72, 73, 74, 75, 76, 77, 78, 79, 80, 81, 82, 83, 84, 85, 86, 87, 88, 89, 90, 91, 92, 93, 94, 95, 96, 97, 98, 99, 99.9, 99.99, or 99.999% or less.

The water can have a total phosphorus concentration, a dissolved phosphorus concentration, a reactive phosphorus concentration, or a combination thereof, of about 0.001 ppm to about 10,000 ppm, about 0.01 ppm to about 20 ppm, or about 0.001 ppm or less, or less than, equal to, or greater than about 0.005 ppm, 0.01, 0.02, 0.04, 0.06, 0.08, 0.1, 0.15, 0.2, 0.4, 0.6, 0.8, 1, 2, 4, 6, 8, 10, 15, 20, 40, 60, 80, 100, 150, 200, 400, 600, 800, 1,000, 1,500, 2,000, 4,000, 6,000, 8,000, or about 10,000 ppm or more.

The water having the salt including the phosphorus separated therefrom can have a total phosphorus concentration, a dissolved phosphorus concentration, a reactive phosphorus concentration, or a combination thereof, of about 0 ppm to about 1 ppm, about 0.0001 ppm to 0.1 ppm, about 0.0001 ppm to 0.05 ppm, or about 0 ppm, or less than, equal to, or greater than about 0.0001 ppm, 0.0002, 0.0004, 0.0006, 0.0008, 0.0010, 0.0012, 0.0014, 0.0016, 0.0018, 0.0020, 0.0022, 0.0024, 0.0026, 0.0028, 0.0030, 0.0032, 0.0034, 0.0036, 0.0038, 0.0040, 0.0045, 0.0050, 0.0060, 0.0080, 0.01, 0.02, 0.04, 0.06, 0.08, 0.1, 0.2, 0.4, 0.6, 0.8, or about 1.0 ppm or more. The water having the salt including the phosphorus separated therefrom can have a total phosphorus concentration, a dissolved phosphorus concentration, a reactive phosphorus concentration, or a combination thereof, that is about 0% to 70% of the respective total phosphorus concentration, a dissolved phosphorus concentration, a reactive phosphorus concentration, or a combination thereof, of the water that is initially contacted with the galvanic cell, or about 0% to about 20%, or about 0%, or less than, equal to, or greater than about 0.001%, 0.005, 0.01, 0.05, 0.1, 0.5, 1, 2, 4, 6, 8, 10, 15, 20, 25, 30, 35, 40, 45, 50, 55, 60, 65, or about 70% or more.

During the immersing of the galvanic cell in the water, the water can have any suitable pH. The pH can be about 2 to about 14, about 5 to about 11, about 5 to about 7, about 10 to about 11, or less then, equal to, or greater than about 2, 2.5, 3, 3.5, 4, 4.5, 5, 5.1, 5.2, 5.3, 5.4, 5.5, 5.6, 5.7, 5.8, 5.9, 6, 6.1, 6.2, 6.3, 6.4, 6.5, 6.6, 6.7, 6.8, 6.9, 7, 7.5, 8, 8.5, 9, 9.5, 10, 10.1, 10.2, 10.3, 10.4, 10.5, 10.6, 10.7, 10.8, 10.9, 11, 11.5, 12, 12.5, 13, 13.5, or more than 14 or more.

The galvanic phosphorus removal stage can include adding acid, base, or a combination thereof to the water to adjust or control the pH thereof. In some embodiments, the method is free of adding acid, base, or a combination thereof to the water. The acid, base, or combination thereof can be added to the water before the immersing of the galvanic cell in the water, during the immersing of the galvanic cell in the water, after the immersing of the galvanic cell in the water, or a combination thereof.

The galvanic phosphorus removal stage can include recirculating the water that immerses the galvanic cell to contact the water with the galvanic cell multiple times. The water can optionally be filtered during the recirculation, such as to remove salt including phosphorus from the water.

Immersing a galvanic cell in water can form treated water including a salt that includes the phosphorus. Contact between the water and the galvanic cell can cause formation of the salt that includes the phosphorus. At least some of the salt including the phosphorus in the treated water can include a solid. Formation of the solid including the phosphorus can include precipitation, flocculation, or a combination thereof.

Separating the salt including the phosphorus from the treated water can be performed in any suitable way. The separating can include decantation, settling, filtration, or a combination thereof. The separating can include separating the treated water from the galvanic cell (e.g., removing water immersing the cell that has been filtered or from which the salt including the phosphorus has otherwise been separated). The separation can occur during a recirculation of the water back to the galvanic cell. The separation can be performed during the contacting the galvanic cell with the water, such as via a filter that is immersed in the water and is continuously filtering the water during the contacting. The separation can occur after the water is removed from the water that immerses the galvanic cell, such as via a filter on an exit line out of the system. The filtration can be conducted using a glass frit, a fabric filter, a paper filter, a disk filter, a rotary filter, a drum filter, a screen, a sieve, particulate filtration media, a filter aid, or a combination thereof. The separated water can be optionally further treated, such as via a further contact with the same or different galvanic cell, filtration, treatment to remove one or more other non-phosphorus materials, pH adjusted, or a combination thereof.

The anode can be a sacrificial anode that is consumed during treatment of the water. The salt including the phosphorus that is formed upon contact of the water with the galvanic cell can include a material from the anode. The method can include forming a hydroxide salt including a material from the anode during the immersing of the galvanic cell in the water. Separating the salt including the phosphorus from the treated water can further include separating the hydroxide salt including the material from the anode from the treated water.

The method can include forming $H_2$ and $HO^-$ at the anode (e.g., generate on the surface of the anode, from water) during the immersing of the galvanic cell in the water. The method can include forming $H_2$ and $HO^-$ at the cathode (e.g., generate on the surface of the cathode, from water) during the immersing of the galvanic cell in the water. The method can include forming $H_2O_2$, $HO_2^-$, or a combination thereof at the cathode (e.g., generate on the surface of the cathode) during the immersing of the galvanic cell in the water. The method can include applying shear to the water during the immersing of the galvanic cell in the water. The shear can be sufficient to dislodge at least some bubbles (e.g., including $H_2$) from the surface of the anode, cathode, or a combination thereof. The shear can be sufficient to at least partially prevent or reduce oxide formation at the surface of the anode. The method can include applying a mechanical force to the galvanic cell immersed in the water, such as a rapping, knocking, agitating, vibration, ultrasound, and the like. The mechanical force can be sufficient to dislodge at least some bubbles including $H_2$ from the surface of the anode, cathode, or a combination thereof; at least partially prevent oxide formation at the surface of the anode; at least partially prevent agglomeration of the salt including the phosphorus on the surface of the anode; or a combination thereof.

The separated water can have a total nitrogen concentration, a dissolved nitrogen concentration, or a combination thereof, that is about 0% to about 70% of the respective total nitrogen concentration, dissolved nitrogen concentration, or a combination thereof, of the water, or about 0% to about 30%, or about 0%, or less than, equal to, or greater than about 0.001%, 0.005, 0.01, 0.05, 0.1, 0.5, 1, 2, 4, 6, 8, 10, 15, 20, 25, 30, 35, 40, 45, 50, 55, 60, 65, or about 70% or more.

The method can further include forming $NH_3$, $NH_4^+$, or a combination thereof, at the cathode (e.g., at the surface of the cathode), wherein the $NH_3$ and $NH_4^+$ include the nitrogen from the water. The method can include forming a salt including the nitrogen during the immersing of the galvanic cell in the water. The separating of the salt including the phosphorus from the treated water can include separating the salt including the nitrogen from the treated water. The salt including the nitrogen can include $NH_4MgPO_4$ or a hydrate thereof (e.g., struvite).

The cathode of the galvanic cell can include Cu, Ni, Fe, or a combination thereof, such as Cu or a Cu alloy. The cathode can be a solid material that is predominantly Cu, Ni, Fe, alloys thereof, or a combination thereof, or another material that is coated with predominantly Cu, Ni, Fe, alloys thereof, or a combination thereof. The cathode can be substantially free of materials other than Cu, Ni, Fe, alloys thereof, or a combination thereof. The cathode can be about 50 wt % to about 100 wt % Cu, Ni, Fe, alloys thereof, or a combination thereof, about 90 wt % to about 100 wt %, or less than, equal to, or greater than about 50 wt %, 55, 60, 65, 70, 75, 80, 82, 84, 86, 88, 90, 91, 92, 93, 94, 95, 96, 97, 98, 99, 99.5, 99.9, 99.99, or about 99.999 wt % or more. In some embodiments, the cathode includes Cu and the anode includes Mg. In some embodiments, the cathode includes Cu and the anode includes Al.

The anode can be a solid material of approximately homogeneous composition or can be a coating on another material. The anode has a different composition than the cathode. The anode can include Mg, Al, Fe, Zn, or a combination thereof. The anode can include an alloy that includes Mg, Al, Fe, Zn, or an alloy thereof. The Mg, Al, Fe, Zn, alloys thereof, or combinations thereof, can be about 50 wt % to about 100 wt % of the anode, or less than, equal to, or greater than about 50 wt %, 55, 60, 65, 70, 75, 80, 85, 90, 91, 92, 93, 94, 95, 96, 97, 98, or about 99, 99.5, 99.9, 99.99, or about 99.999 wt % or more. The anode can be substantially free of materials other than Mg, Al, Fe, Zn, alloys thereof, or combinations thereof.

The anode can further include Ag, Pt, Au, or a combination thereof. The Ag, Pt, Au, or the combination thereof is about 0.0001 wt % to about 20 wt %, about 0.0001 wt % to about 5 wt %, or about 0 wt %, or about 0.0001 wt % or less, or 0.0002, 0.0004, 0.0006, 0.0008, 0.0010, 0.0012, 0.0014, 0.0016, 0.0018, 0.0020, 0.0022, 0.0024, 0.0026, 0.0028, 0.0030, 0.0032, 0.0034, 0.0036, 0.0038, 0.0040, 0.0045, 0.0050, 0.0060, 0.0080, 0.01, 0.02, 0.04, 0.06, 0.08, 0.1, 0.2, 0.4, 0.6, 0.8, 1, 1.5, 2, 4, 6, 8, 10, 12, 14, 16, 18, or about 20 wt % or more.

The anode can include Mg or an Mg alloy. The anode can be substantially free of materials other than Mg or alloys thereof. The anode can be magnesium alloy AZ91 that is about 90 wt % Mg, about 9 wt % Al, and about 1 wt % Zn. The anode can be about 50 wt % to about 100 wt % Mg or Mg alloy, about 90 wt % to about 100 wt % Mg or Mg alloy, or less than, equal to, or greater than about 50 wt %, 55, 60, 65, 70, 75, 80, 85, 90, 91, 92, 93, 94, 95, 96, 97, 98, 99, 99.5, 99.9, 99.99, or about 99.999 wt % Mg or Mg alloy or more. The salt including the phosphorus can include magnesium phosphate, magnesium potassium phosphate (e.g., "K-struvite"), a hydrate thereof, or a combination thereof, wherein the magnesium phosphate or magnesium potassium phosphate includes Mg from the anode. The magnesium phosphate can be in any suitable form, such as monomagnesium phosphate ($Mg(H_2PO_4)_2$), dimagnesium phosphate ($MgHPO_4$), trimagnesium phosphate ($Mg_3(PO_4)_2$), a hydrate thereof, or a combination thereof. The separating of the salt including the phosphorus from the treated water can include separating the magnesium phosphate from the treated water. The water can further includes nitrogen, wherein the salt including the phosphorus includes $NH_4MgPO_4$ or a hydrate thereof (e.g., struvite), with the $NH_4MgPO_4$ including the phosphorus and Mg from the anode. The method can include forming $Mg(OH)_2$ including Mg from the anode during the immersing of the galvanic cell in the water. The separating of the salt including the phosphorus from the treated water can include separating the $Mg(OH)_2$ from the treated water. During the immersing of the galvanic cell in the water, the water can have a pH of about 9.5 to about 11.5, or about 10 to about 11, or less than, equal to, or greater than 9.5, 9.6, 9.7, 9.8, 9.9, 10.0, 10.1, 10.2, 10.3, 10.4, 10.5, 10.6, 10.7, 10.8, 10.9, 11.0, 11.1, 11.2, 11.3, 11.4, or about 11.5 or more. The method can include regulating a rate of introduction of fresh water to the galvanic cell such that the water that immerses the galvanic cell is maintaining at a pH of about 9.5 to about 11.5, or about 10 to about 11, or less than, equal to, or greater than 9.5, 9.6, 9.7, 9.8, 9.9, 10.0, 10.1, 10.2, 10.3, 10.4, 10.5, 10.6, 10.7, 10.8, 10.9, 11.0, 11.1, 11.2, 11.3, 11.4, or about 11.5 or more. The method can include immersing the galvanic cell in the water until the water reaches a pH of about 9.5 to about 11.5 or about 10 to about 11, and then regulating a rate of introduction of fresh water to the galvanic cell such that the water that immerses the galvanic cell is maintained at a pH of about 9.5 to about 11.5 or about 10 to about 11.

The anode can include Al. The anode can be substantially free of materials other than Al. The anode can be about 50 wt % to about 100 wt % Al, about 90 wt % to about 100 wt % Al, or less than, equal to, or greater than about 50 wt %, 55, 60, 65, 70, 75, 80, 85, 90, 91, 92, 93, 94, 95, 96, 97, 98, or about 99, 99.5, 99.9, 99.99, or about 99.999 wt % or more. The salt including phosphorus can include $AlPO_4$ or a hydrate thereof. Separating of the salt including the phosphorus from the treated water can include separating the $AlPO_4$ from the treated water. The method can include forming aluminum hydroxide or a hydrate thereof (e.g., $Al(OH)_3$ or polyaluminum hydroxide), the aluminum hydroxide including Al from the anode during the immersing of the galvanic cell in the water. Separating of the salt including the phosphorus from the treated water can include separating the aluminum hydroxide from the treated water. During the immersing of the galvanic cell in the water, the water has a pH of about 4 to about 8, about 5 to about 7, or about 4 or less, or about 4.2, 4.4, 4.6, 4.8, 5, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7, 7.2, 7.4, 7.6, 7.8, or about 8 or more. The method can include regulating a rate of introduction of an acid to the water such that the water that immerses the galvanic cell is maintained at a pH of about 4 to about 8, about 5 to about 7, or about 4 or less, or about 4.2, 4.4, 4.6, 4.8, 5, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7, 7.2, 7.4, 7.6, 7.8, or about 8 or more. The acid can be added to the water prior to the immersion of the galvanic cell in the water, during the immersion of the galvanic cell in the water, after the immersion of the galvanic cell in the water, or a combination thereof. The acid can be any suitable acid, at any suitable concentration. The acid can include sulfuric acid, acetic acid, hydrochloric acid, or a combination thereof. The method can include flocculating salts that include Al from the treated water.

The cathode can have a work function that is larger than the work function of the anode. For example, Cu has a work function of about 4.53-5.10 eV, Mg has a work function of about 3.66 eV, and Al has a work function of about 4.06-4.26 eV. The conductive connector can have a work function that is between the work function of the cathode and the work function of the cathode.

The galvanic cell can include a conductive connector that electrically connects the anode and the cathode. The conductive connector has a different composition than the anode or the cathode. The conductive connector can be a solid material with a homogeneous composition or can be a coating on another material. The conductive connector can include Cu, Zn, Fe, Cd, Ni, Sn, Pb, or a combination thereof. The conductive connector can include Cu. The conductive connector can include Zn. The conductive connector can include an alloy including Cu and Zn. The conductive connector can include brass. The conductive connector can include brass, and can be substantially free of other materials. The conductive connector can be about 50 wt % to about 100 wt % brass, about 90 wt % to about 100 wt %, or less than, equal to, or greater than about 50 wt %, 55, 60, 65, 70, 75, 80, 85, 90, 91, 92, 93, 94, 95, 96, 97, 98, or about 99, 99.5, 99.9, 99.99, or about 99.999 wt % or more.

The water can have any suitable conductivity during immersion of the galvanic cell in the water, such as about 100 μS to about 1,000,000 μS, or about 300 μS to about 100,000 μS, or about 100 μS to about 1,200 μS, or less than, equal to, or greater than about 100 μS, 200, 300, 400, 500, 600, 700, 800, 900, 1,000, 1,100, 1,200, 1,500, 2,000, 4,000, 6,000, 10,000, 15,000, 20,000, 50,000, 100,000, 150,000, 200,000, 250,000, 500,000, 750,000, or about 1,000,000 μS or more. The method can be free of regulation of the conductivity of the water. In some embodiments, the method can include regulating the conductivity of the water such that the conductivity is maintained at about 100 μS to about 1,000,000 μS, or about 300 μS to about 100,000 μS, or about 100 μS to about 1,200 μS, or less than, equal to, or greater than about 100 μS, 200, 300, 400, 500, 600, 700, 800, 900, 1,000, 1,100, 1,200, 1,500, 2,000, 4,000, 6,000, 10,000, 15,000, 20,000, 50,000, 100,000, 150,000, 200,000, 250, 000, 500,000, 750,000, or about 1,000,000 μS or more. Regulating the conductivity of the water can include regulating a rate of introduction of fresh water to the galvanic cell. Regulating the conductivity of the water can include adding one or more salts to the water. The salt can be added to the water before immersing the galvanic cell in the water, during the immersion of the galvanic cell in the water, after the immersion of the galvanic cell in the water, or a combination thereof. The one or more salts added to the water to regulate the conductivity thereof can include halogen salts, sodium salts, potassium salts, or a combination thereof. The one or more salts added to the water to regulate the conductivity thereof can include sodium chloride.

The galvanic cell can generate a current when immersed in the water. The amount of current generated by the electrical cell can be any suitable amount of current, such as about 0.001 mA/cm$^2$ to about 10 mA/cm$^2$, 0.01 mA/cm$^2$ to about 0.5 mA mA/cm$^2$, or less than, equal to, or greater than about 0.001 mA/cm$^2$, 0.005, 0.01, 0.015, 0.02, 0.025, 0.03, 0.035, 0.04, 0.045, 0.05, 0.06, 0.07, 0.08, 0.09, 0.1, 0.15, 0.2, 0.25, 0.3, 0.35, 0.4, 0.45, 0.5, 0.6, 0.7, 0.8, 0.9, 1, 1.2, 1.5, 2, 2.5, 3, 4, 5, 6, 7, 8, 9, or about 10 mA/cm$^2$ or more.

The immersing of the galvanic cell in the water can be sufficient to oxidize the phosphorus in the water. The method can be free of treating the water with an oxidizer or an oxidative treatment other than any oxidation that occurs due to immersion of the galvanic cell in the water. In some embodiments, the method includes oxidizing phosphorus in the water prior to the immersion of the galvanic cell in the water, during the immersion of the galvanic cell in the water, or a combination thereof. The method can include oxidizing phosphorus in the water prior to the immersion of the galvanic cell in the water. Oxidizing the phosphorus in the water can include contacting an oxidizer and the water to oxidize the phosphorus (e.g., to oxidize phosphorus in organic matter or solid matter that contains phosphorus). An aqueous solution of the oxidizer can be added to the water. The aqueous solution of the oxidizer has a concentration of the oxidizer of about 0.001 ppm to about 999,999 ppm, about 50,000 ppm to about 140,000 ppm, or less than, equal to, or greater than about 0.001 ppm, 0.005, 0.01, 0.05, 0.1, 0.5, 1, 1.5, 2, 5, 10, 15, 20, 50, 100, 150, 200, 500, 1,000, 1,100, 1,200, 1,500, 2,000, 2,500, 5,000, 10,000, 15,000, 20,000, 50,000, 100,000, 150,000, 200,000, 500,000, 750,000, or about 999,999 ppm or more. The oxidizer can be any suitable oxidizer that oxidizes the phosphorus. The oxidizer can include ferrate, ozone, ferric chloride (FeCl$_3$), potassium permanganate, potassium dichromate, potassium chlorate, potassium persulfate, sodium persulfate, perchloric acid, peracetic acid, potassium monopersulfate, hydrogen peroxide, sodium hypochlorite, potassium hypochlorite, hydroxide, sulfite, a free radical via decomposition thereof, or a combination thereof. Sufficient oxidizer can be added, and sufficient treatment conditions used, such that the oxidizer converts substantially all dissolved phosphorus in the water into oxidized forms of phosphorus.

Byproducts of an oxidation process can include negatively charged ionic compounds that readily accept electrons and as a result are preferentially reduced at the surface of copper in the galvanic cell. Many of these compounds have very low regulatory limits, and the galvanic process can be used to remove or reduce the concentration of one or more of these highly regulated compounds prior to the discharge or reuse of the treated water. Examples of the most common compounds that can be reduced or removed are chloramines, chlorates, perchlorates, bromates, hypochlorous acid, bleach, and the like, organic compounds, and combinations thereof. Further, the galvanic phosphorus removal stage can reduce the oxygen levels in the water to values below 1 ppm, thus creating attractive condition for subsequent anoxic or anaerobic processes.

The method can be free of performing any steps to adjust pH of the treated water. In some embodiments, the method can include adjusting the pH of the treated water to be about 6 to 8, or about 7, or less than, equal to, or greater than about 6, 6.1, 6.2, 6.3, 6.4, 6.5, 6.6, 6.7, 6.8, 6.9, 7, 7.1, 7.2, 7.3, 7.4, 7.5, 7.6, 7.7, 7.8, 7.9, or about 8 or more.

The method can include immersing one or more of the galvanic cells in an enclosure including the water. The method can include filtering the salt including the phosphorus from the treated water via one of more filters that are at least partially submerged in the water that immerses the galvanic cells. The filter can include a glass frit, a fabric filter, a paper filter, a disk filter, a rotary filter, a drum filter, a screen, a sieve, particulate filtration media, a filter aid, or a combination thereof. The filter can be a rotating disk filter. The filtering can include forming a filter cake on the filter, the filter cake including the salt including the phosphorus. The filtering can include backwashing the filter to remove the filter cake from the filter and to form a backwash liquor that includes the removed filter cake. Any suitable water can be used to backwash the filter, such as a portion of the water including the precipitate is used to backwash the filter.

The one or more galvanic cells can be positioned in the water at side portions of the enclosure, wherein the filter is positioned approximately in a central portion of the enclosure in the water such that the filter is in-between the plurality of galvanic cells. The method can include using a plurality of filters. The plurality of filters can include a plurality of rotating disk filters.

The galvanic cell can include an anode including Mg, Al, Fe, Zn, or a combination thereof. The galvanic cell can include a cathode including Cu, Ni, Fe, or a combination thereof. The galvanic cell can also include a conductive connector that electrically connects the anode and the cathode, the conductive connector including Cu, Zn, Fe, Cd, Ni, Sn, Pb, or a combination thereof. In some embodiments, the anode and the cathode directly contact one another and the galvanic cell is free of the conductive connector, such that the electrodes are in an "electroless" configuration. In an electroless configuration, the sacrificial anode material can be galvanically plated or deposited on the non-sacrificial cathode material, eliminating a need for conductive connectors to electrically connect the anode and the cathode. One advantage of various embodiments of the electroless configuration is that less metallic copper can be used and the electric drop between the electrodes can decrease compared to the configuration including conductive connectors.

The galvanic cell can include one cathode, or a plurality of cathodes. The galvanic cell can include one anode, or a plurality of anodes. The galvanic cell can include no conductive connector, one conductive connector, or a plurality of conductive connectors. The galvanic cell can include a plurality of conductive connectors, wherein each conductive connector independently electrically connects the anode and cathode (e.g., in a parallel, rather than a series configuration). The plurality of conductive connectors can be approximately evenly distributed around a perimeter of the galvanic cell. The conductive connector can include a connector or fastener, such as a screw, a bolt, a nut, a washer, or a combination thereof.

The galvanic cell can be of any suitable size or configuration such that the surface area of the galvanic cell(s) per unit volume of water containing phosphorus to be removed is sufficient to effect removal of the phosphorus during the residence time of the water in the container. The galvanic cell can have any suitable total surface area per galvanic cell, or total anode surface area exposed to water per cell, such as about 1 cm² to about 1,000,000 cm², about 5 cm² to about 200,000 cm², about 10 cm² to about 50,000 cm², about 20 cm² to about 40,000 cm², or about 1 cm² or less, or less than, equal to, or greater than 2 cm², 4, 6, 8, 10, 15, 20, 25, 30, 35, 40, 45, 50, 75, 100, 150, 200, 250, 500, 750, 1,000, 1,500, 2,000, 2,500, 5,000, 7,500, 10,000, 15,000, 20,000, 25,000, 30,000, 35,000, 40,000, 45,000, 50,000, 75,000, 100,000, 150,000, 200,000, 500,000, 750,000, or about 1,000,000 cm² or more. The galvanic cell can have any suitable ratio of anode surface area to cathode surface area, such as a ratio of anode surface area exposed to water to cathode surface area exposed to water, such as about 0.1 to about 10, 0.5 to 2, or less than, equal to, or greater than about 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2, 2.1, 2.2, 2.3, 2.4, 2.5, 2.6, 2.8, 3, 3.5, 4, 4.5, 5, 5.5, 6, 7, 8, 9, or about 10 more. In some embodiments, the anode, the cathode, or a combination thereof, includes a roughened or etched surface for enhanced surface area. For the methods described herein, any suitable number of galvanic cells can be used, such as 1, 1 to 1,000,000, 1 to 1,000, 1 to 20, or less than, equal to, or greater than 2, 3, 4, 5, 6, 7, 8, 9, 10, 12, 14, 16, 18, 20, 25, 30, 35, 40, 45, 50, 60, 70, 80, 90, 100, 125, 150, 175, 200, 225, 250, 300, 400, 500, 750, 1,000, 1,250, 1,500, 1,750, 2,000, 2,500, 3,000, 4,000, 5,000, 10,000, 20,000, 50,000, 100,000, 250,000, 500,000, or about 1,000,000 or more. The cells can be used in series or parallel electrical arrangement.

The galvanic cell can include a spacing between a surface of the anode and a surface of the cathode (e.g., between the cathode and at least about 50% to 100% of the surface area of the anode, or about 80% to about 100%, or less than, equal to, or greater than about 50%, 55, 60, 65, 70, 75, 80, 85, 90, 95, 96, 97, 98, or about 99% or more) of about 1 mm to about 110 mm, or about 2 mm to about 30 mm, or less than, equal to, or greater than about 1 mm, 2, 3, 4, 5, 6, 7, 8, 9, 10, 11, 12, 13, 14, 15, 16, 17, 18, 19, 20, 21, 22, 23, 24, 25, 26, 27, 28, 29, 30, 32, 34, 36, 38, 40, 45, 50, 55, 60, 65, 70, 75, 80, 85, 90, 95, 100, 105, or about 110 mm or more.

The galvanic cell can be planar in form, having a thickness that is less than a height and width. The galvanic cell can include a planar frame of the galvanic cell and a cathode material included within a perimeter of the frame, wherein the cathode material is electrically connected to the frame (e.g., via direct contact thereto). The frame can be a structural component of the galvanic cell. The frame can be structurally sufficient to maintain its shape in the absence of any of or all of the anodes. The planar frame and the cathode material included within the perimeter of the frame can both be the cathode.

The planar frame can be a nonporous solid material. The planar frame can be one or more strips of cathode material assembled to form the frame. The planar frame can have a polygonal perimeter, such as a square or rectangle. The cathode material included within the perimeter of the planar frame can include a porous cathode material, such as including wire, mesh, screen, a sheet including one or more through-holes, or a combination thereof. The porous cathode material can include a wire mesh or a wire screen including the porous cathode material. The porous cathode material included within the perimeter of the planar frame can have edges that are sandwiched between two of the planar frames, the two planar frames held together to secure the porous cathode material therebetween with one or more of the conductive connectors, such as via compression, via conductive connectors passing through one or more through-holes of the porous cathode material, or a combination thereof.

The galvanic cell can include a plurality of pairs of the planar frames (e.g., 2 pairs to 20 pairs, or 2 pairs to 10 pairs, or less than, equal to, or greater than 2, 3, 4, 5, 6, 7, 8, 9, 10, 11, 12, 13, 14, 15, 16, 17, 18, 19, or 20 or more pairs), with each pair held together to secure the porous cathode material therebetween with one or more of the conductive connectors, and each pair separated by one or more of the anodes spanning across the porous cathode material included within the perimeter of the planar frame. The one or more anodes that separate each pair of planar frames from one another can directly contact a face of each pair of planar frames separated therewith. The one or more anodes that separate each pair of planar frames from one another can directly contact a face of one of each pair of planar frames separated therewith and can be free of direct contact with a face of the other of each pair of planar frames separated therewith.

The anode can be a strip fastened to the planar frame at two edges of the planar frame, wherein the anode is fastened to the planar frame with at least one of the conductive connectors at each of the two edges of the planar frame, such that the anode spans across the cathode material included within the perimeter of the planar frame forming a gap between the cathode material included within the perimeter of the planar frame and the anode strip. The anode and the cathode can directly contact one another at each of the edges of the planar frame where the anode is fastened to the planar frame via the at least one conductive connector.

The galvanic cell can include a plurality of the anodes, wherein each anode is a strip fastened to the planar frame at two edges of the planar frame on a face of the frame, wherein each of the anodes is fastened to the planar frame with at least one of the conductive connectors at each of the two edges of the planar frame, such that each of the anodes spans across the cathode material included within the perimeter of the planar frame forming a gap between the cathode material included within the perimeter of the planar frame and the anode strip, wherein the plurality of the anodes are spaced-apart across the face of the such that they do not physically contact one another. Each of the anodes can span across the cathode material included within the perimeter of the planar frame approximately parallel to one another on the face; anodes on another face of the planar frame can be parallel or perpendicular to the anodes on the first face. The two edges of the planar frame to which are fastened each anode can be opposite edges of the planar frame. The galvanic cell can have all of its anodes on a single major face of the planar frame, or some of the anodes can be on one major face of the planar frame and the other anodes are on another major face of the frame.

FIG. 1A illustrates a galvanic cell 110 viewed from a major face, according to various embodiments. The galvanic cell 110 includes the cathode, wherein the cathode includes a planar frame 120 of the galvanic cell having a polygonal perimeter and a porous material 130 included within the perimeter of the frame that is a wire mesh or a wire screen that is in direct contact with the frame. The galvanic cell 110 includes a plurality of the anodes 140, wherein each anode is a strip fastened to the planar frame at two opposite edges of the planar frame on a face of the planar frame. Each of the anodes is fastened to the planar frame with at least one of the conductive connectors 150 at each of the two edges of the planar frame, such that each of the anodes are approximately parallel to one another and span across the porous material included within the perimeter of the planar frame forming a gap (not shown) between the porous material included within the perimeter of the planar frame and the anode strip. Each anode directly contacts the cathode frame at each of the edges of the planar frame where the anode is fastened to the planar frame via the at least one conductive connector. Conductive connectors (not shown) can also be used that only pass through the planar frame 120 to secure the porous material 130 therebetween. The plurality of the anodes are spaced-apart across the face of the such that they do not physically contact one another, and wherein the gap (not shown) is about 1 mm to about 110 mm.

Figure 1B:
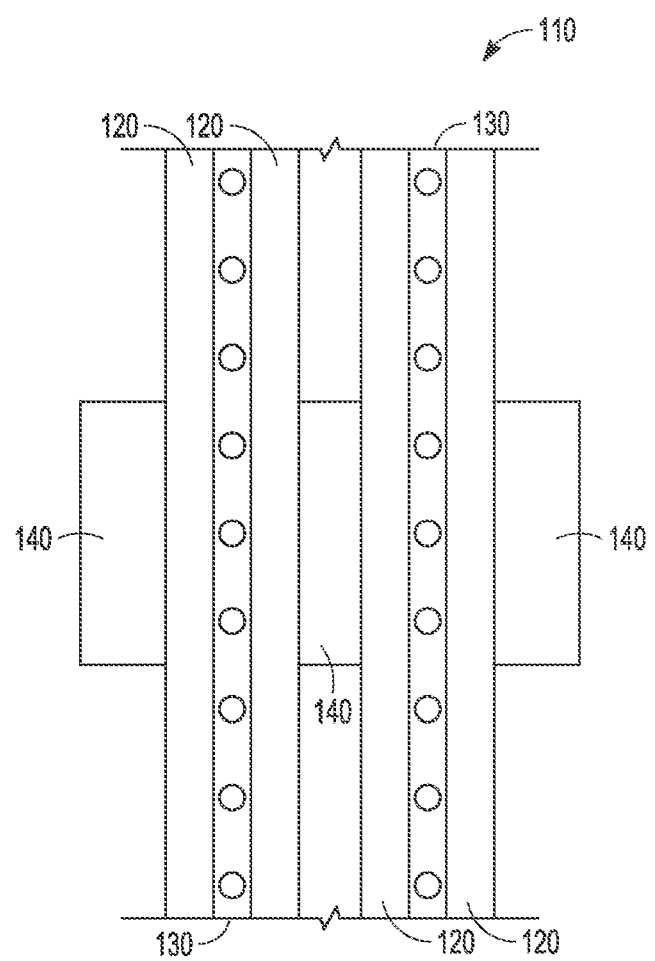
FIG. 1B illustrates a zoomed-in cutaway edge view of an electrochemical cell, according to various embodiments.

FIG. 1B illustrates a zoomed-in cutaway edge-view of galvanic cell 110, viewed along the perspective shown to the right of FIG. 1A. The galvanic cell can include a plurality of pairs of the planar frames 120, with each pair held together to secure the porous cathode material 130 therebetween with one or more of the conductive connectors (not shown). Anodes 140 spanning across the porous cathode material 130 included within the perimeter of the planar frame 120. Each pair of planar frames 120 is separated by anodes 140 (only one such anode is shown in FIG. 1B). The one or more anodes 140 that separate each pair of planar frames from one another directly contact a face of each pair of planar frames 120 separated therewith.

In various embodiments, the galvanic phosphorus removal stage can also reduce the concentration of or remove other toxic or regulated materials, such as materials formed during the electrolytic removal of nitrogen stage, such as oxidizing materials (e.g., chlorate, chlorite, bromate, and the like). Such oxidizing species can polarize the galvanic cell, which can favor the oxidation kinetics of metallic aluminum.

In embodiments of the galvanic cell including aluminum in the anode, the dissolution of the aluminum anode during the operation of the galvanic cell can generate high localized concentrations of aluminum ions on or very near the surface of the electrode which can favor the supersaturation and thermodynamic conditions for the precipitation of aluminum phosphate compounds. This surface condition can create a low metal-to-phosphorus molar ratio, even when phosphorus levels in water are below 0.1 ppm. The resulting equilibrium concentration of phosphate remaining in solution can be much lower than those obtained by simply adding aluminum salts to the water. When adding aluminum salts to phosphate-containing waters with the intent to obtain phosphorous concentrations below about 0.1 ppm, the metal-to-phosphorus molar ratios must be close to 8. In contrast, in the galvanic process described herein, the molar ratio of metal to phosphorus can be less than 8, such as approximately 1.

Optional Further Removal of Nitrogen Stage.

The method of removing phosphorus and nitrogen optionally includes (e.g., either includes, or is free of) one or more additional stages for removing nitrogen from the water after the water has passed through the galvanic phosphorus removal stage. The one or more additional stages can include any suitable method of removing additional nitrogen from the water.

In some embodiments, the optional further removal of nitrogen stage includes removal of nitrate. The optional further removal of nitrogen can include exposing the water to denitrifying bacteria to convert water-soluble nitrogen therein to nitrogen gas that is removed, such as described in WO 2020/046679 which is hereby incorporated by reference in its entirety. The method can include deoxygenating the water prior to the further removing of nitrogen therefrom. The method can include oxidizing or hydrolyzing at least some nitrogen in the water to form nitrate prior to the further removing of nitrogen therefrom. The method can include reoxygenating the water after the further removing of nitrogen therefrom.

In some embodiments, the optional further removal of nitrogen stage includes optionally oxidizing or hydrolyzing at least some nitrogen in the water to form nitrate; optionally deoxygenating the water to an oxygen concentration of about 0 ppm to about 0.3 ppm; exposing the water to denitrifying bacteria immobilized on a porous substrate, to convert nitrate in the water to nitrogen gas that is removed and to form a denitrified water; and optionally reoxygenating the denitrified water to an oxygen concentration of about 1 ppm to about 20 ppm.

The denitrified water can have a total nitrogen concentration that is about 0.0 ppm to about 2 ppm total nitrogen.

Method of Removing Nitrogen from Water.

Various embodiments of the present invention provide a method of removing nitrogen from water. The method can include passing the water through an electrolytic cell to remove nitrogen from the water as nitrogen gas. The method can include any feature described herein for the electrolytic nitrogen removal stage.

Prior to passing through the electrolytic cell, the water can have any suitable chloride concentration, such as 50 ppm to 40,000 ppm, 200 ppm to 10,000 ppm, or 50 ppm or more, or less than, equal to, or greater than 100 ppm, 200, 500, 1,000, 2,000, 4,000, 6,000, 8,000, 10,000, 15,000, 20,000, 30,000, or 40,000 ppm or less.

The water can be passed through a single electrolytic cell, or a plurality of electrolytic cells. The water passed through the electrolytic cell is allowed to contact the anode and cathode and can be allowed to flow between the anode and cathode. Water passing through the electrolytic cell can partially or fully submerge/immerse the electrolytic cell. Shear can be applied to the water as it is passed through the electrolytic cell, to increase exposure of the water to the cathode and anode surfaces.

The water immersing the electrolytic cell can have any suitable pH, such as a pH of 6 to 12, 6 to 7, or 6 or more, or less than, equal to, or greater than 6.5, 7, 7.5, 8, 8.5, 9, 9.5, 10, 10.5, 11, 11.5, or 12 or less. The method can include adding one or more bases to the water to regulate or maintain the pH of the water, such as sodium hydroxide; in other embodiments, the method is free of adding acids or bases to the water to maintain or regulate the pH thereof.

The electrolytic cell can be operated in any suitable way to remove nitrogen as nitrogen gas from the water. The cell can be operated with DC current or AC current. The electrolytic cell can be operated with any suitable current density, such as 0.001-0.1 A/cm$^2$, 0.02-0.04 A/cm$^2$, or 0.001 A/cm$^2$ or more, or less than, equal to, or greater than 0.005, 0.01, 0.015, 0.02, 0.025, 0.03, 0.035, 0.04, 0.045, 0.05, 0.06, 0.07, 0.08, 0.09, or 0.1 A/cm$^2$ or less.

The electrolytic cell includes an anode. The anode can include titanium oxide, ruthenium oxide, and iridium oxide supported on titanium ($TiO_2$—$RuO_2$—$IrO_2$/Ti); or titanium oxide and ruthenium oxide supported on titanium ($TiO_2$—$RuO_2$/Ti); or titanium and platinum (Ti—Pt); or a combination thereof. The anode and cathode materials can be selected such that the electrodes favor the formation of chlorine gas to form hypochlorite during operation of the electrolytic cell.

The electrolytic cell includes a cathode. The cathode can include titanium, stainless steel, or a combination thereof. The cathode can include stainless steel.

The electrolytic cell can include a spacing between the anode and cathode, such as a spacing of 0.5-8 mm, 2-4 mm, or 0.5 mm or more, or less than, equal to, or greater than 1 mm, 1.5, 2, 2.5, 3, 3.5, 4, 4.5, 5, 6, 7, or 8 mm or less.

The method is not limited to any particular mechanism of removing nitrogen from the water as ammonia using the electrolytic cell. The removing of nitrogen as nitrogen gas can include converting ammonia in the water to nitrogen gas using the electrolytic cell. Passing the water through the electrolytic nitrogen removal stage can produce hypochlorite in the water which can react with ammonia in the water to form the nitrogen gas, which can be released to the environment. The electrolytic cell can produce any suitable hypochlorite concentration in the water being passed therethrough, such as 100-20,000 ppm hypochlorite, 2000-2500 ppm, or 100 ppm or more, or less than, equal to, or greater than 200 ppm, 400, 600, 800, 1,000, 1,200, 1,400, 1,600, 1,800, 2,000, 2,100, 2,200, 2,300, 2,400, 2,500, 2,600, 2,800, 3,000, 4,000, 6,000, 8,000, 10,000, 15,000, or 20,000 ppm or less.

The method can remove any suitable amount of nitrogen from the water. For example, passing the water through the electrolytic nitrogen removal stage can remove 80% to 100% of ammonia from the water, 99-100%, or 80% or more, or less than, equal to, or greater than 81%, 82, 83, 84, 85, 86, 87, 88, 89, 90, 91, 92, 93, 94, 95, 96, 97, 98, 99, 99.9, 99.99, or 99.999% or less.

In various embodiments, the method of removing nitrogen from the water as nitrogen gas can also include removing phosphorus from the water, such as any suitable amount of phosphorus. For example, passing the water through the electrolytic nitrogen removal stage can remove 0.1 to 90% of reactive phosphorus from the water, or 1-30%, or 0.1% or more, or less than, equal to, or greater than 2%, 4, 6, 8, 10, 12, 14, 16, 18, 20, 22, 24, 26, 28, 30, 40, 50, 60, 70, 80, or 90% or less.

System for Removal of Nitrogen and Phosphorus from Water.

Various embodiments of the present invention provide a system for removal of nitrogen and phosphorus from water. The system can be any suitable system that can perform the method for removing nitrogen and phosphorus from water described herein. The system can include an elevated pH phosphorus removal stage configured to raise pH of starting material water to greater than or equal to 7.5 to precipitate a phosphorus salt from the water and configured to remove the precipitated phosphorus salt from the water. The system can include an electrolytic nitrogen removal stage including an electrolytic cell configured to remove nitrogen from the water as nitrogen gas. The system can include a galvanic phosphorus removal stage including a galvanic cell including an anode including Mg, Al, Fe, Zn, or a combination thereof, and a cathode having a different composition than the anode, the cathode including Cu, Ni, Fe, or a combination thereof. The galvanic cell can be configured to form a treated water including a salt that includes phosphorus from the water. The galvanic phosphorus removal stage can be configured to separate the salt including the phosphorus from the treated water. The water produced by the system has a lower phosphorus concentration and a lower nitrogen concentration than the starting material water.

Apparatus for Removal of Nitrogen from Water.

Various embodiments of the present invention provide an apparatus for removal of nitrogen from water. The apparatus can be any suitable apparatus that can perform the method for removing nitrogen from water described herein. The apparatus can include an electrolytic cell through which water is configured to be flowed to remove nitrogen from the water as nitrogen gas. The electrolytic cell includes a cathode that can include stainless steel and/or titanium. The electrolytic cell includes an anode that can include titanium oxide, ruthenium oxide, and iridium oxide supported on titanium ($TiO_2$—$RuO_2$—$IrO_2$/Ti); or titanium oxide and ruthenium oxide supported on titanium ($TiO_2$—$RuO_2$/Ti); or titanium and platinum (Ti—Pt); or a combination thereof. The anode and cathode materials can be selected such that the electrodes favor the formation of chlorine gas to form hypochlorite during operation of the electrolytic cell. Using the apparatus to remove nitrogen as nitrogen gas can remove 80-100% of ammonia from the water.

EXAMPLES

Various embodiments of the present invention can be better understood by reference to the following Examples which are offered by way of illustration. The present invention is not limited to the Examples given herein.

Galvanic cells of several sizes were utilized to evaluate aspects of the process as outlined in the Examples. The galvanic cells are referenced as "small", "medium", and "large", as defined below. Magnesium anodes were AZ91, with 90 wt % Mg, 9 wt % Al, and 1 wt % Zn, and were 99.9 wt % pure. Aluminum anodes were 99.9 wt % pure aluminum. The copper used in copper frames and copper mesh was 99.9 wt % pure copper.

Figure 2A:
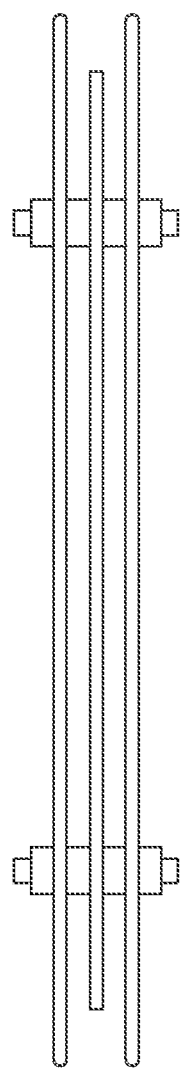
FIG. 2A illustrates a photograph along the edge of an Al—Cu electrochemical cell, in accordance with various embodiments.
Figure 2B:
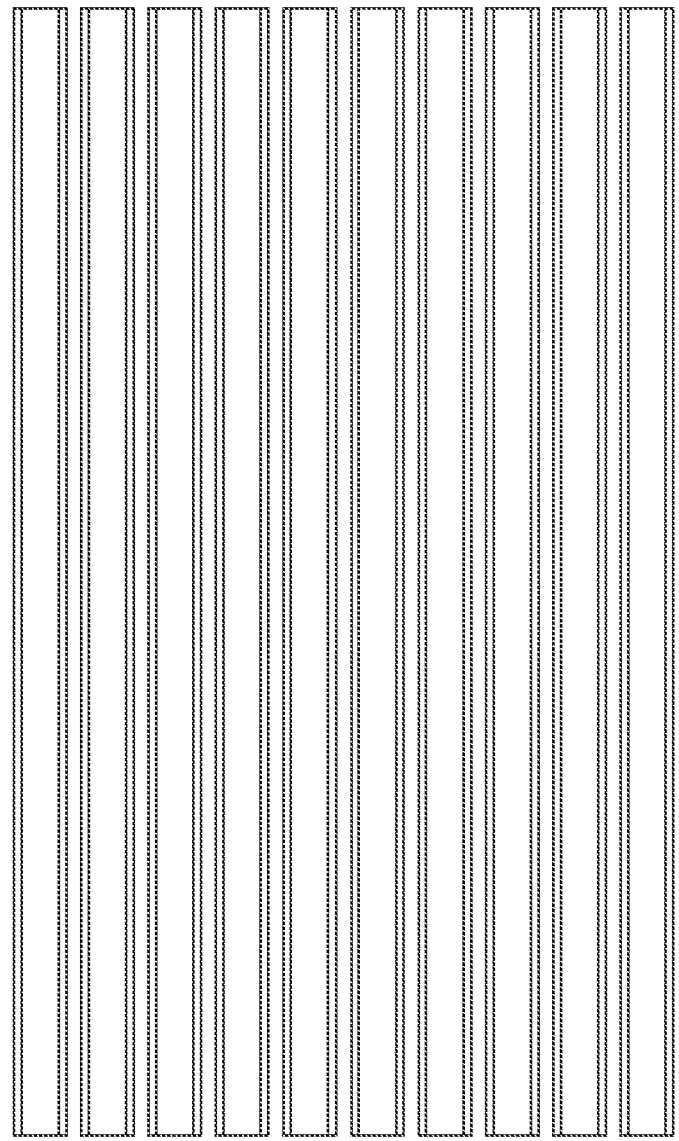
FIG. 2B illustrates a photograph along an edge of a plurality of Al—Cu electrochemical cells, in accordance with various embodiments.

For a small-sized cell, having copper cathodes and either an aluminum or magnesium anode, the finished size was 5 cm×20 cm with a thickness of about 4 mm and utilized copper meshes and an anode having a thickness of about 1 mm each. The small-sized cell included a single pair of copper meshes with an anode sandwiched therebetween, with the copper meshes and the anode separated from the copper meshes by 0.5 cm using electrically insulating plastic screws. The copper meshes were electrically connected to one another via a copper wire. The anode and the cathode were not electrically connected to one another (other than via multimeter and the surrounding water). The resulting surface area of sacrificial anode exposed to the water was about 400 $mm^2$ per cell. FIG. 2A illustrates a photograph along the edge of an Al—Cu electrochemical cell For a medium-sized cell, having a copper cathode and either aluminum or magnesium anodes, the finished size was about 300 mm×45 mm with a thickness of about 10 mm and utilized a single pair of copper meshes with an anode sandwiched therebetween. The copper mesh directly contacted the anode, and was connected thereto via brass bolts (common brass, 67 wt % copper and 33 wt % Zn). The resulting surface area of sacrificial anode exposed to the water was about 31,400 $mm^2$ per cell. FIG. 2B illustrates a photograph along an edge of a plurality of medium-sized Al—Cu electrochemical cells.

The large-sized electrochemical cells used in the Examples included cathodes that are pairs of planar solid copper frames that sandwich a copper mesh, with brass connectors securing the copper frames together to secure the copper mesh between the frames. The solid copper frames formed a rigid structural perimeter of the cell, with the copper mesh filling the entire area within the perimeter of each pair of copper frames. A plurality of anode strips, which were magnesium alloy or aluminum, were fastened to the perimeter of the frame with brass fasteners such that they spanned from one edge of the frame to the other frame, directly contacting the frame and forming a gap between the anodes and the copper mesh. Each electrochemical cell included two pairs of the copper frames having the copper mesh therebetween (i.e., four copper frames total, with two copper meshes). A first pair of copper frames had anodes affixed to a single major face thereof, the second pair of copper frames had anodes affixed to both major faces thereof, with the two pairs of copper frames affixed to one another with brass fasteners such that they do not directly contact one another and such that they sandwich the anodes affixed to one major face of the second pair of copper frames. The brass fasteners were common brass and were 67 wt % copper and 33 wt % Zn. The anodes ran horizontally across each major face of the copper frames and parallel to one another, with 6 anodes affixed to each face. From one major face of the electrochemical cell to the other, the order of components is 1) the anodes affixed to a major face of the first pair of copper frames, 2) the first pair of copper frames having copper mesh therebetween, 3) the anodes affixed to a major face of the second pair of copper frames, 4) the second pair of copper frames having copper mesh therebetween, and 5) the anodes affixed to the other major face of the second pair of copper frames. The ratio of anode surface area to cathode surface area for the electrochemical cell was about 1:1.

For a large-sized cell, each copper frame had a thickness of 3.175 mm (⅛ inch). The height of the copper frame was 400 mm and the length of the copper frame was 400 mm. The copper mesh had a thickness of 1.5875 mm, such that each pair of copper frames sandwiching the copper mesh had a thickness of about 8 mm. The anode strips had a length of 400 mm, a width of 45 mm, and a thickness of 6 mm. The thickness of the entire electrochemical cell was about 30 mm. The gap between the anodes on each face of the copper frames was 12-18 mm. The gap between the anodes affixed to each pair of copper frames and the copper mesh sandwiched therebetween was 12-18 mm. The large-sized cell using aluminum anodes included an anode surface area exposed to the water of about 290,000 mm$^2$, and the large-sized cell using magnesium included an anode surface area exposed to the water of about 868,000 mm$^2$.

Figure 2C:
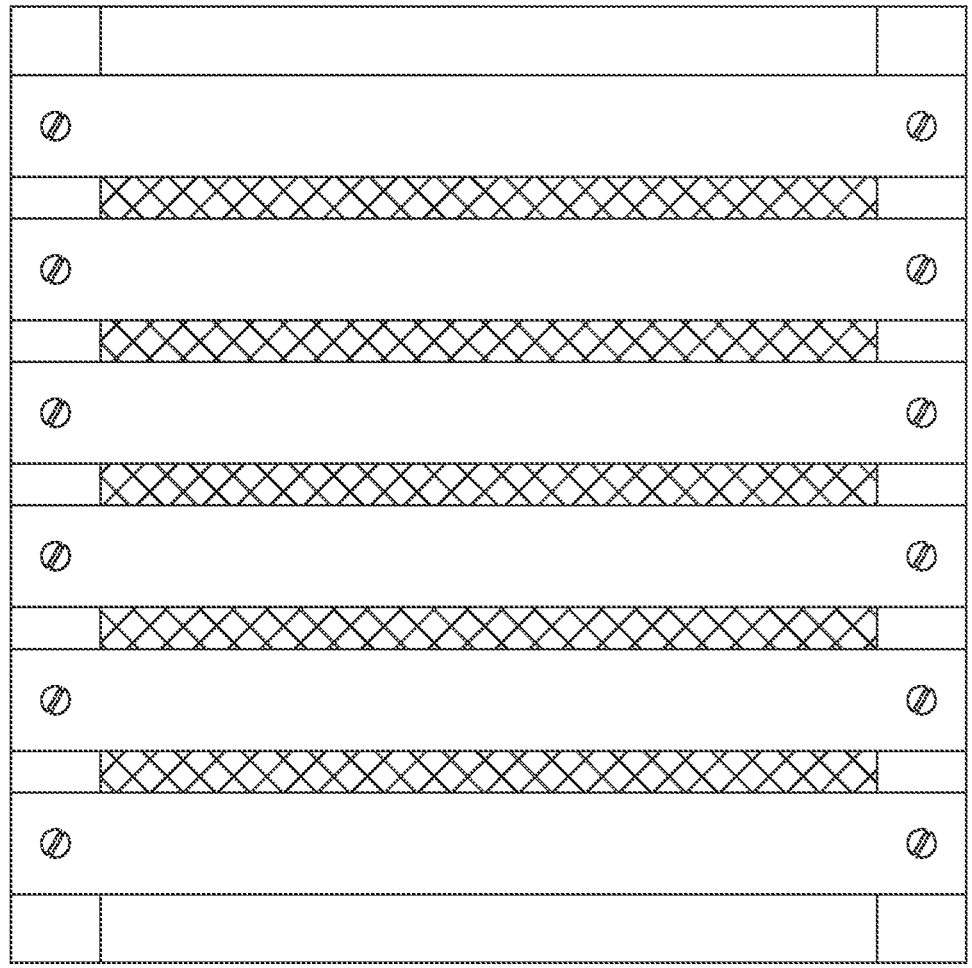
FIG. 2C illustrates a photograph of a major face of a Mg—Cu electrochemical cell, in accordance with various embodiments.
Figure 2D:
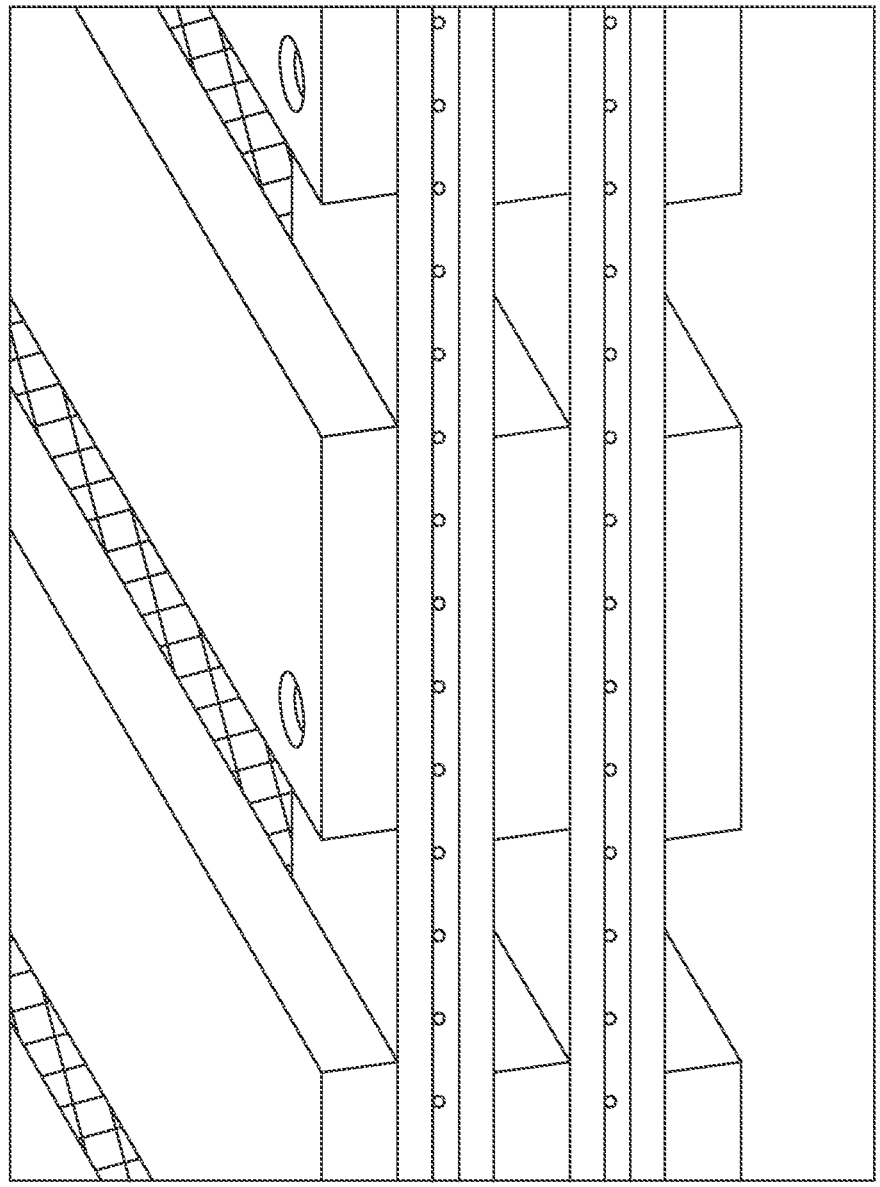
FIG. 2D illustrates a photograph of an edge of a Mg—Cu electrochemical cell, in accordance with various embodiments.
Figure 2E:
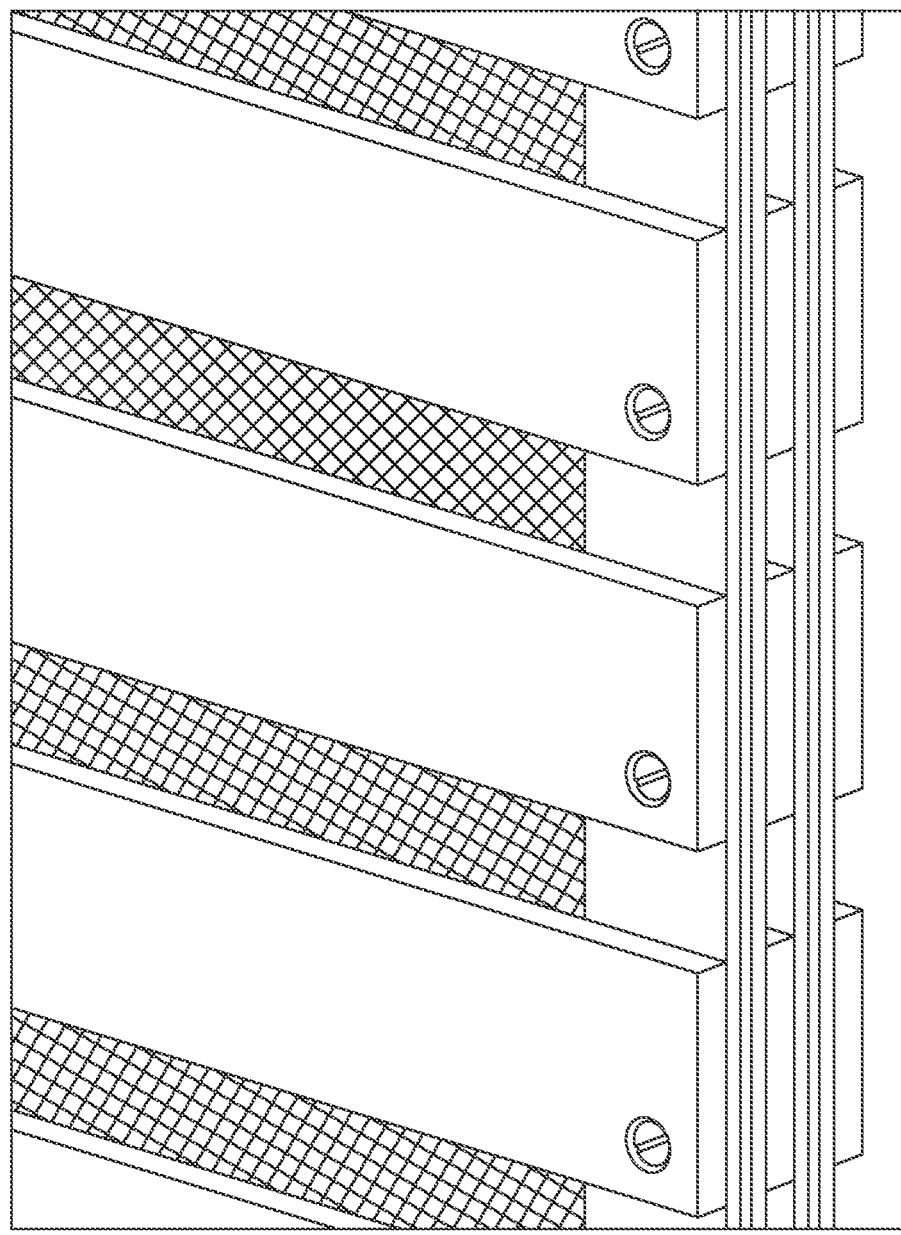
FIG. 2E illustrates a photograph of an edge of a Mg—Cu electrochemical cell, in accordance with various embodiments.

FIG. 2C illustrates a photograph of a major face of the large-sized Mg—Cu electrochemical cell used in the Examples. FIGS. 2D and 2E illustrate close-up photographs of an edge of the large-sized Mg—Cu electrochemical cell used in the Examples.

Figure 2F:
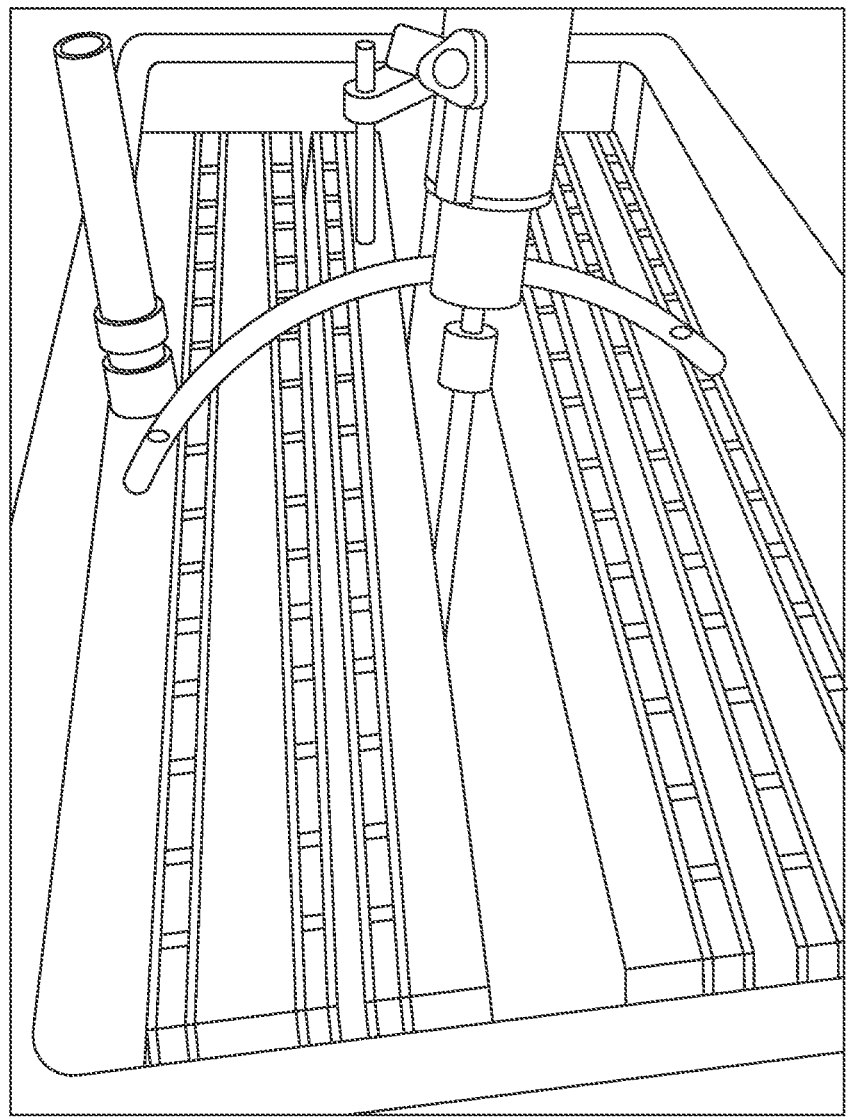
FIG. 2F illustrates a photograph showing a top view of a system for removing materials from water, in accordance with various embodiments.
Figure 2G:
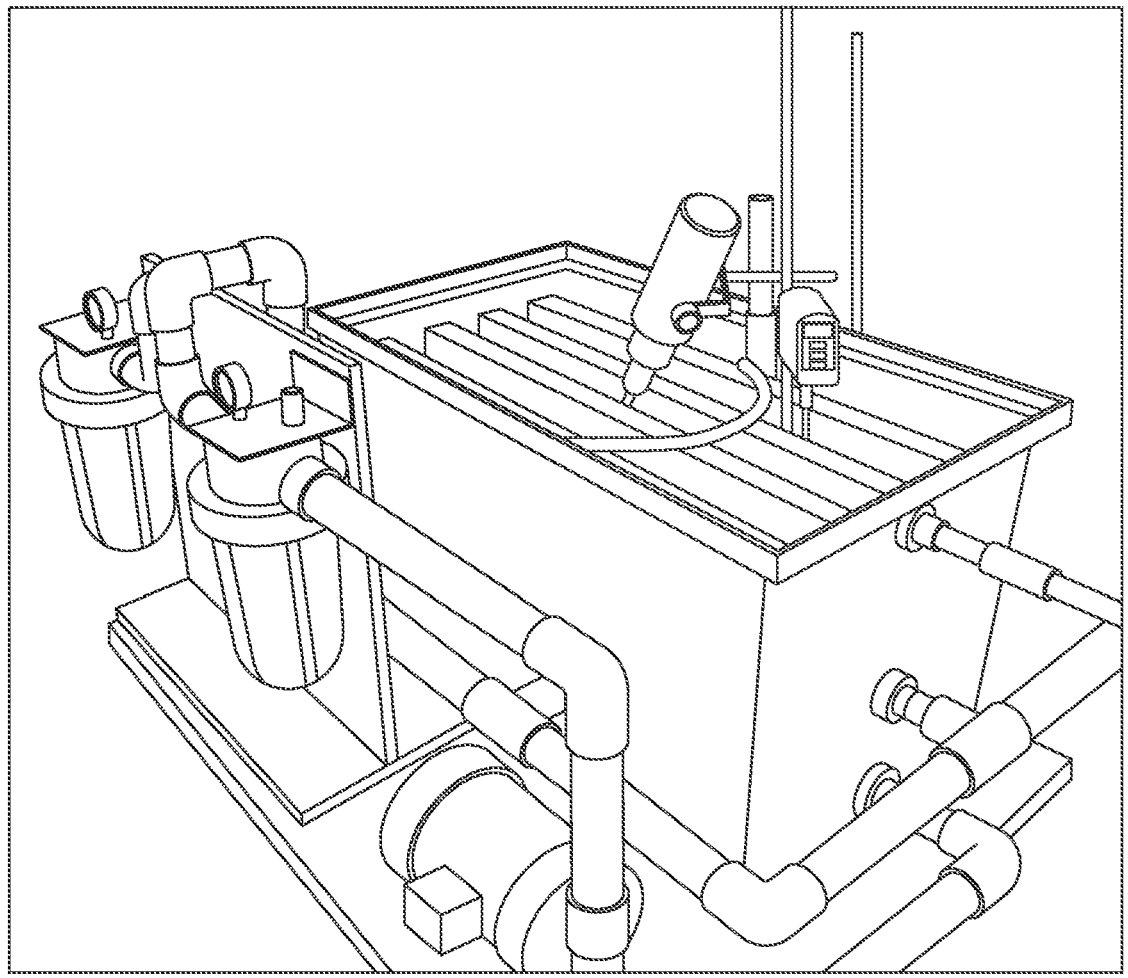
FIG. 2G illustrates a photograph showing a side-view of a system for removing materials from water, in accordance with various embodiments.

In the Examples herein, the Al—Cu or Mg—Cu electrochemical cell was completely immersed in water in a container, such that electrochemical cell was vertically oriented with the anodes running vertically. When multiple electrochemical cells were used, they were separated by about 25 mm using a wooden frame. In the middle of the container a mechanical stirrer was used to agitate the water therein. Water was filtered and fed into the container using a pump. Another pump was used to circulate water and filter water within the container (e.g., to remove precipitate therefrom), with water pumped from one side of the container and recirculated to the other side. A pump connected to a reservoir of 10% HCl was used to add HCl to the container to adjust the pH of the water therein. The water in the container was measured to determine the pH thereof, which was used to determine the amount of acid that needed to be added from the reservoir to maintain a specific pH. The water fed into the container was analyzed to determine initial pH, initial conductivity, and initial reactive phosphorus content. For the Mg—Cu cell, the water fed into the container was also analyzed to determine the initial dissolved magnesium content. The pH and conductivity of water in the container was measured. The container included a drain at the water level of the container to allow water to exit the system. The water that exited the system was analyzed to determine the final pH, final conductivity, and final reactive phosphorus content. For the Al—Cu cell, the water exiting the containing was analyzed to determine the total Al and dissolved Al. For the Mg—Cu cell, the water exiting the container was analyzed to determine the dissolved magnesium content. FIG. 2F illustrates a photograph showing a top-view of the system used in the Examples, with the specific embodiment shown in the photograph having 12 electrochemical cells (6 in front, and 6 in back arranged edge-to-edge with the 6 in front). FIG. 2G illustrates a photograph showing a side-view of the system used in the Examples, with the specific embodiment having 12 electrochemical cells therein.

The "reactive phosphorus concentration" refers to the soluble reactive phosphorus in solution (e.g., orthophosphate) and was measured by US-EPA 365.1: Determination of Phosphorus by Semi-Automated Colorimetry. The pH was measured using an Oakton® pH 700 meter. The conductivity was measured using an Oakton® CON 150 meter. The dissolved magnesium content was measured using a Thermo Scientific™ Dionex™ Aquion™ ion chromatography system. The total aluminum content and dissolved aluminum content were measured using a Hach Aluminum TNT plus' vial test. Dissolved Al was determined at the pH of the water exiting the container. Total Al was determined by adjusting the pH to 2.

Part I. Galvanic Cell.

Example 1. Removal of Phosphorus with Al—Cu Cell, Initial P Concentration 0.033 ppm Water was taken from one of the channels of a local lake and the residence time in the galvanic process was modified by adjusting the water flow to provide specific residence times while keeping the other variables of the system constant (pH, conductivity, and concentration of phosphorus). Residence time (i.e., volume of the container divided by the flow rate) was gradually decreased until removal performance was reduced and then held constant for this Example. For a low initial concentration of phosphorus (0.033 ppm) residence time was reduced to approximately 15 min while maintaining an average of about 90% removal of phosphorus. The Al—Cu cell was medium-sized. The results are shown in Table 1.

TABLE 1

Removal of phosphorus with Al-Cu cell, initial P concentration 0.033 ppm.

| Water Source | Local Lake (C44) | | |
|---|---|---|---|
| Flow Rate (mL/min) | 650 | 950 | 1261 |
| Residence Time (mins) | 30 | 20 | 15 |
| Electrochemical cells | 8 | 8 | 8 |
| Initial pH | 8.43 | 8.43 | 8.43 |
| Final pH | 7.05 | 7.03 | 7.02 |
| Initial Conductivity (μS) | 776 | 776 | 776 |
| Final Conductivity (μS) | 778 | 778 | 778 |
| Initial reactive-P (ppm) | 0.033 | 0.033 | 0.033 |
| Final reactive-P (ppm) | 0.0028 | 0.0028 | 0.0027 |
| % P removal | 91.5 | 91.5 | 91.5 |
| Final total Al (ppm) | 1.18 | 1.00 | 1.00 |
| Final dissolved Al (ppm) | 0.134 | 0.115 | 0.110 |

Example 2. Removal of Phosphorus with Al—Cu Cell, Initial P Concentration 0.451 ppm Water from a local inland wastewater treatment facility was processed to evaluate the effect of increasing solution conductivity. Residence time was held constant during this Example at 21 min. Conductivity was modified by adding NaCl. This Example demonstrates the beneficial effect of increased conductivity on the effectiveness of phosphorus removal. The Al—Cu cell was medium-sized. The results are shown in Table 2.

TABLE 2

Removal of phosphorus with Al-Cu cell, initial P concentration 0.451 ppm. Cell size = medium.

| Water Source | Inland Wastewater Plant | |
|---|---|---|
| Flow Rate (mL/min) | 920 | 920 |
| Residence Time (mins) | 21 | 21 |
| Electrochemical cells | 8 | 8 |
| Initial pH | 7.69 | 7.69 |
| Final pH | 7.02 | 6.93 |
| Initial Conductivity ($\mu$S) | 673 | 960 |
| Final Conductivity ($\mu$S) | 672 | 962 |
| Initial reactive-P (ppm) | 0.451 | 0.451 |
| Final reactive-P (ppm) | 0.062 | 0.027 |
| % P removal | 86.3 | 94.0 |
| Final total Al (ppm) | 1.15 | 1.81 |
| Final dissolved Al (ppm) | 0.037 | 0.056 |

Example 3. Removal of Phosphorus with Al—Cu Cell, Initial P Concentration 0.392 ppm A coastal wastewater treatment plant effluent with high electrical conductivity was treated using the medium Al—Cu cell. As noted in Example 2 above, increased conductivity is beneficial. The water treated in this Example was from a coastal location where the salt (NaCl) concentration results in elevated conductivity. The purpose of this Example is to evaluate the loss of sacrificial electrode material to the treated water solution and to evaluate this relationship as a function of pH. The final phosphorus removal efficiency remained constant; however, the concentration of total aluminum (dissolved and solid) decreases when modifying the pH from pH 7 to pH 6.5. This Example demonstrates the ability to control the loss of material from the sacrificial electrode by adjusting the pH. The results are shown in Table 3.

TABLE 3

Removal of phosphorus with Al-Cu cell, initial P concentration 0.392 ppm. Cell size = medium.

| Water Source | Coastal Wastewater Facility | |
|---|---|---|
| Flow Rate (mL/min) | 920 | 920 |
| Residence Time (mins) | 21 | 21 |
| Electrochemical cells | 8 | 8 |
| Initial pH | 9.06 | 9.06 |
| Final pH | 7.00 | 6.47 |
| Initial Conductivity ($\mu$S) | 3100 | 3100 |
| Final Conductivity ($\mu$S) | 3141 | 3110 |
| Initial reactive-P (ppm) | 0.392 | 0.392 |
| Final reactive-P (ppm) | 0.042 | 0.032 |
| % P removal | 89.3 | 91.8 |
| Final total Al (ppm) | 2.24 | 1.90 |
| Final dissolved Al (ppm) | 0.055 | 0.059 |

Example 4. Removal of Phosphorus with Al—Cu Cell, Initial P Concentration 0.648-0.762 ppm Water from a local fresh water retention pond was spiked with phosphoric acid to obtain a concentration of 0.75 ppm of phosphorus and was treated utilizing multiple galvanic cells in a continuous flow apparatus with a flow of about 2 gallons per minute (GPM) (large cell). The pH of the water was adjusted incrementally downward to values between 7 and 6. An increase the percentage of removal from 82% at pH=7 to 97% at pH=6 was observed, while reducing the soluble aluminum remaining in the treated water. The results are shown in Table 4.

TABLE 4

Removal of phosphorus with Al-Cu cell, initial P concentration 0.648-0.762 ppm. Cell size = large.

| Water Source | Retention Pond | | |
|---|---|---|---|
| Flow Rate (mL/min) | 7797.1 | 7797.1 | 7797.1 |
| Residence Time (mins) | 20-25 | 20-25 | 20-25 |
| Electrochemical cells | 12 | 12 | 12 |
| Initial pH | 7.03 | 7.06 | 7.03 |
| Final pH | 6.96 | 6.5 | 5.95 |
| Initial Conductivity ($\mu$S) | 680.9 | 689 | 680.9 |
| Final Conductivity ($\mu$S) | 671.7 | 676.3 | 695.4 |
| Initial reactive-P (ppm) | 0.742 | 0.648 | 0.762 |
| Final reactive-P (ppm) | 0.135 | 0.047 | 0.024 |
| % P removal | 81.8 | 92.7 | 96.9 |
| Final total Al (ppm) | 3.17 | 2.78 | 4.38 |
| Final dissolved Al (ppm) | 0.035 | 0.029 | 0.028 |

Example 5. Conductivity Effects on Electrical Current Generated by Al—Cu Cell Versus Time Using a small-sized cell, Al-foil and Cu screens having a size of 5 cm×2 cm were separated by 0.5 cm using plastic screws. The Al-foil/Cu was placed in a simple compartment with magnetic stirring that was filled with 30 mL water from a local freshwater retention pond. The currents were measured with a Keithley 175 multimeter connected in series. The initial conductivity was adjusted with NaCl. The electrical current generated by the Al—Cu galvanic pair in the Al—Cu cell was measured. This electric current is a measure of the amount of the anode material that was transformed in the electrodes as a function of time, e.g., the oxidation reaction of aluminum to generate aluminum ions and the decomposition of water on the copper electrode to generate hydrogen and hydroxyl ions.

Figure 3:
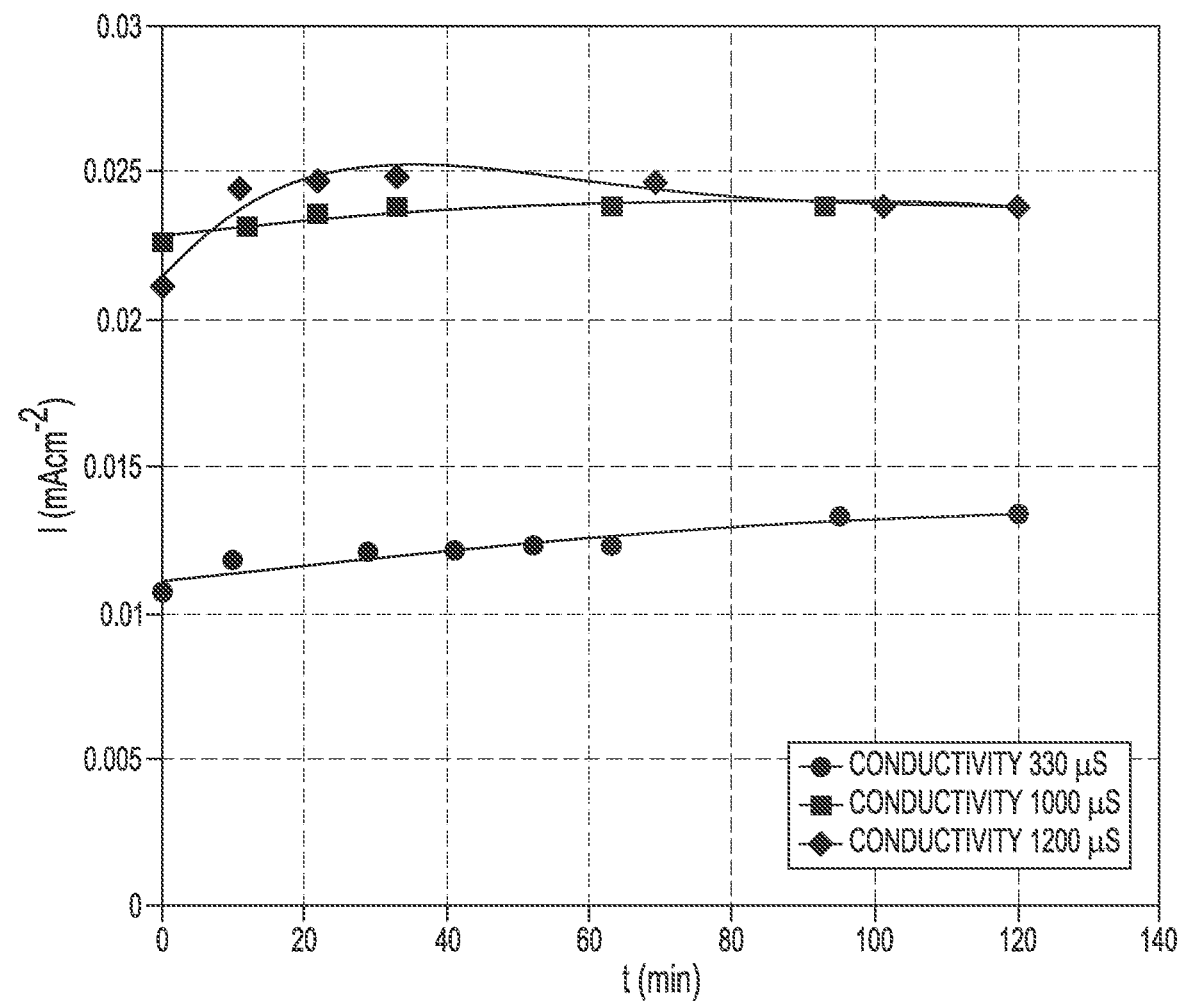
FIG. 3 illustrates electrical current generated by an Al—Cu cell versus time for solutions having various conductivities, in accordance with various embodiments.

FIG. 3 shows the variation of the electric current that was generated by the Al—Cu galvanic pair as a function of the conductivity of the solution. The initial pH of the water was not modified and was about 7. An increase of the initial conductivity of the solution up to a value of 1000 $\mu$S increases the electric current due to a decrease in the resistance between the electrodes thereby increasing the rate of the chemical reactions at the electrode surface. A similar result was obtained in Example 2. Increasing the conductivity to values higher than 1000 $\mu$S resulted in little change in the electrical current because at higher conductivity values the rate limiting step of the reaction is the kinetics of the chemical processes at the surface of the electrodes.

Example 6. pH Effects on Electrical Current Generated by Al—Cu Cell Versus Time

Figure 4:
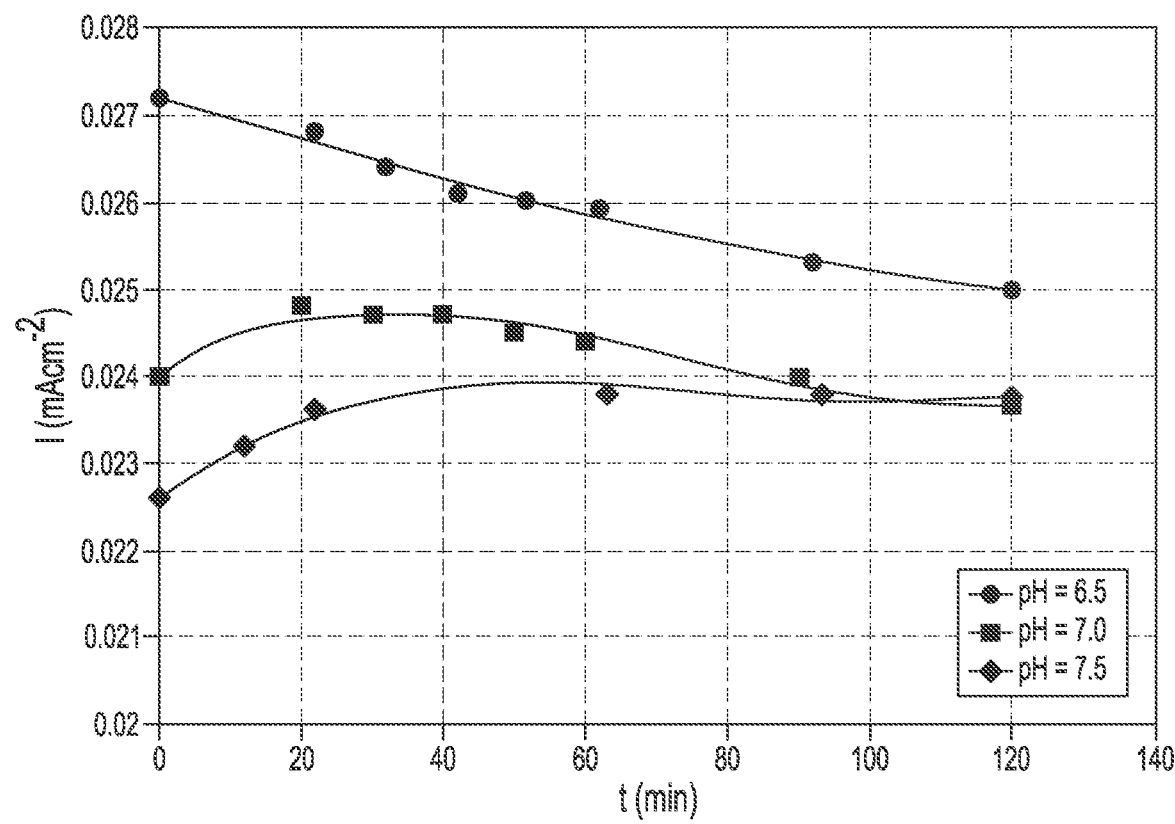
FIG. 4 illustrates electrical current generated by an Al—Cu cell versus time for solutions having various pH levels, in accordance with various embodiments.

The same experimental conditions as Example 5 were used, but adjusting the initial pH with NaOH, with the initial conductivity of the water adjusted with NaCl to about 1000 $\mu$S. FIG. 4 shows the variation of the electric current generated by the Al—Cu galvanic pair as a function of the pH of the solution. Decreasing the pH of the solution favors the kinetics of the decomposition of water on the copper electrode, which translates into an increase in electrical current by the Al—Cu galvanic pair.

Figure 5A:
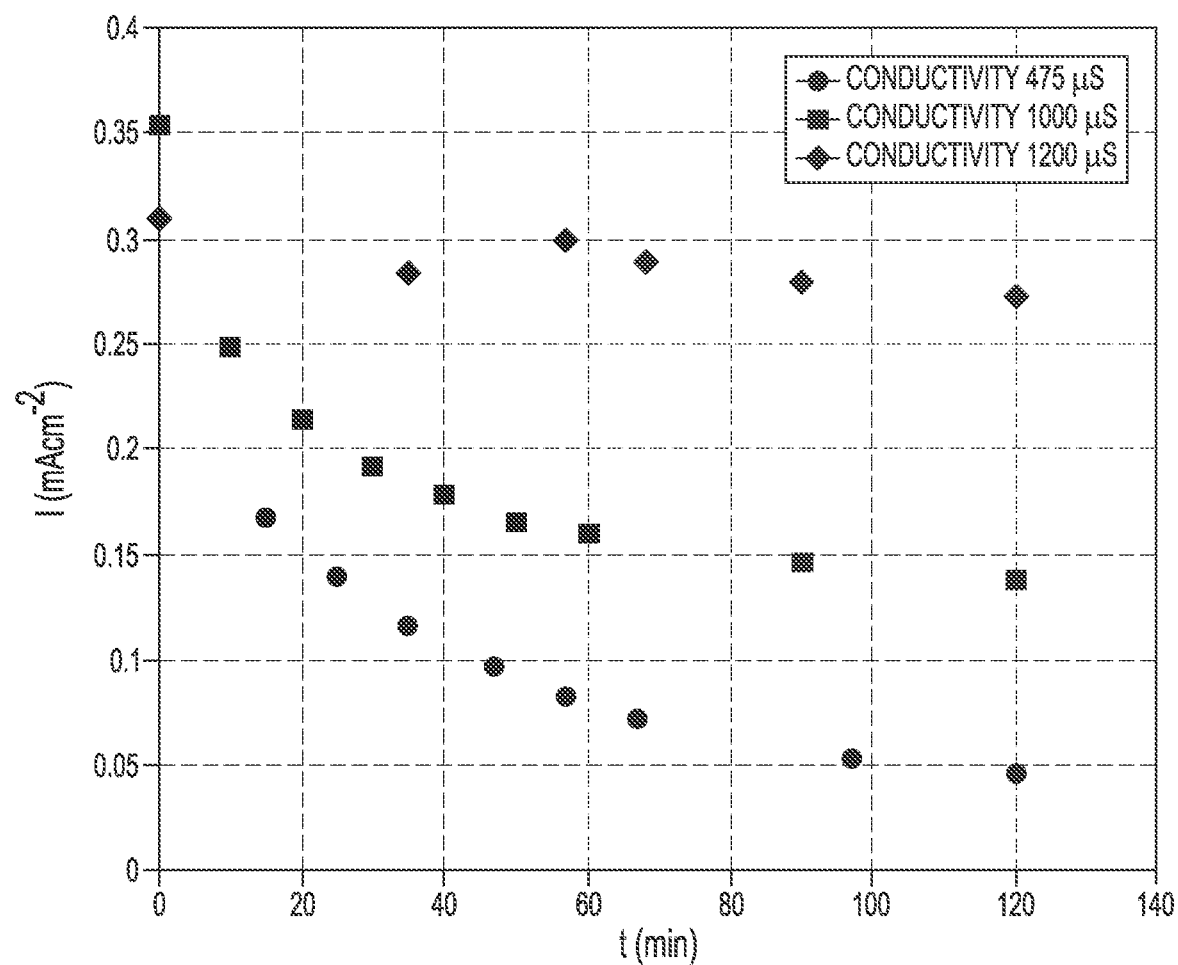
FIG. 5A illustrates electrical current generated by an Mg—Cu cell versus time for solutions having various conductivities, in accordance with various embodiments.
Figure 5B:
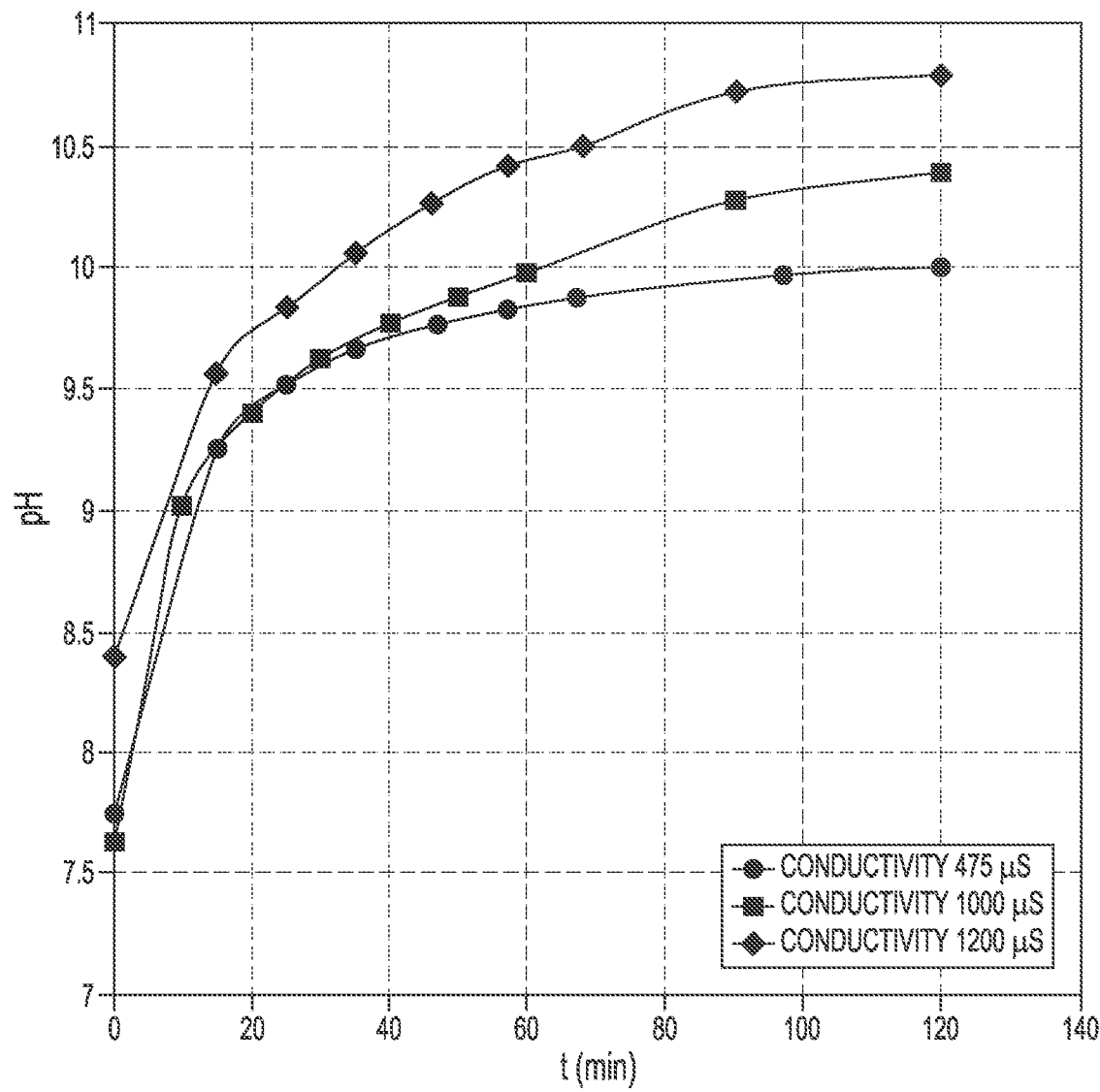
FIG. 5B illustrates electrical current generated by an Mg—Cu cell versus time for solutions having various pH levels, in accordance with various embodiments.

Example 7. Conductivity Effects on Electrical Current Generated by Mg—Cu Cell Versus Time The same experimental conditions as Example 5 were used, without modification of pH, and with modification of conductivity using NaCl. FIG. 5A shows the variation of the electric current that circulates in the Galvanic pair of Mg—Cu as a function of the water conductivity of a local freshwater holding pond. The increase of the conductivity of the water produces remarkable increases in the electric current of the electrochemical cell. The effect of this increase in conductivity in the kinetics of chemical reactions is shown in FIG. 5B, where it improves the kinetics of the pH increase.

Example 8. Mg—Cu Cell, Initial P Concentration 0.392-0.451

Two bodies of water from treatment plants were compared; the water collected from a coastal waste-water treatment plant (WWTP) has three times more conductivity than the water from an inland WWTP due to salt water inclusion in the processing system. The higher conductivity favors the reaction kinetics and thus for the same residence time a greater phosphorus removal occurs in the higher conductivity water while consuming the same amount of sacrificial anode (resulting in the same amount of magnesium ions in solution) as with the lower conductivity. The Mg—Cu cell was medium-sized. The results are shown in Table 5.

TABLE 5

Mg-Cu cell, initial P concentration 0.392-0.451.
Cell size = medium.

|  | Inland WWTP | Coastal WWTP |
| --- | --- | --- |
| Flow Rate (mL/min) | 370 | 370 |
| Residence Time (mins) | 50 | 50 |
| Electrodes | 8 | 8 |
| Initial pH | 7.69 | 9.06 |
| Final pH | 10.90 | 10.94 |
| Initial Conductivity (uS) | 960 | 3100 |
| Final Conductivity (uS) | 1124 | 3148 |
| Initial reactive-P (ppm) | 0.451 | 0.392 |
| Final reactive-P (ppm) | 0.122 | 0.061 |
| % P removal | 72.9 | 84.4 |
| Initial dissolved Magnesium (ppm) | 17 | 56 |
| Final dissolved Magnesium (ppm) | 44 | 95 |

Part II. Galvanic Cell Used with Phosphorus Removal Stage and Electrolytic Nitrogen Removal Stage.

Example 9

Water obtained was remnant process water from a phosphate mine reservoir at around pH 4.3 and containing around 260 ppm $NH_3$, 120 ppm reactive phosphorus, 3600 ppm Na, 500 ppm Mg, 280 ppm Ca, and 5800 ppm chloride. The water was stored in 250-gallon totes to be used as influent water.

The influent water was pumped continuously from the tote at 100 mL/min by a Cole Parmer peristaltic pump and tubing into a 3-gallon tank called the mixing tank. Inside the mixing tank was a mixer to ensure good mixing. Approximately 5% sodium hydroxide was dosed via a Cole Parmer pump and tubing at approximately 0.5 mL/min continuously to maintain a mixing tank pH of 8.5. Anionic polymer flocculant dissolved in water (0.01%) was dosed in a similar manner to bring the mixing tank flocculant concentration to around 5 ppm. As the water entered the mixing tank its pH would be brought up from 4.3 to 8.5 and calcium phosphate, struvite and other unknown precipitates formed. Total solids were approximately 500 ppm. Solid concentration was determined by weighing the 5-micron filter bag after a set period and dividing by total flow over that time. The solids then contacted the flocculant, increasing particle size, and overflowed from the mixing tank into a 5-micron bag filter. The solids were removed from the water, leaving between 4 and 8 ppm of reactive phosphorus and 180 to 200 ppm of $NH_3$—N in the water. Reactive phosphorus, ammonia, and both free and total chlorine was determined by HACH test kits and the appropriate colorimetric method on the spectrophotometer.

After passing through the 5-micron bag filter, the flowed by gravity into a 3-gallon settling tank to allow any remaining precipitates to settle at the bottom of the tank. These solids were periodically cleaned out by passing the entire settling tank through the 5-micron filter again as needed.

Water was then pumped from the top of the settling tank to the electrolysis tank at 100 mL/min via a Cole Parmer peristaltic pump and tubing. This water is called post-settling tank water.

The electrolysis tank was a 1.5 L plastic vessel. Inside the electrolysis tank was a mixer to ensure good mixing, and an electrode. The electrode was prepared using a 9" by 2" titanium oxide, ruthenium oxide, and iridium oxide supported on titanium ($TiO_2$—$RuO_2$—$IrO_2$/Ti) screen as the anode, and a 9" by 2" 304 stainless steel screen as the cathode. Several plastic nuts and bolts were used to fix the anode and cathode approximately 2-4 mm apart from each other. One set of brass nuts and bolts were affixed separately through each the anode and the cathode screens to provide contact points for the DC power generator. The anode and cathode were connected to the DC power generator by alligator clips provided with the DC power generator. The DC power generator was set to provide power at 6.5 amps and around 4.2 V. The electrode produced between 2000 and 2500 ppm of bleach through oxidation of the chloride in solution. Side reactions on the cathode would also cause precipitation of residual calcium and phosphorus on the surface of the electrode, as well as a drop in pH. To maintain an appropriate pH of around 7, 2.5% sodium hydroxide was dosed in a similar manner to the mixing tank. The bleach produced reacts with the ammonia to produce nitrogen gas which is evolved to the atmosphere. The side reaction precipitates were cleaned off the cathode manually as needed to remove them from the surface of the electrode. The entire electrolysis tank was dumped into the 5-micron filter after the mixing tank to remove the solids from the water. Water then overflowed the electrolysis tank with between 0.1 and 2 ppm reactive phosphorus, 0 to 1 ppm $NH_3$, and 0 to 300 ppm residual free and total chlorine.

Water overflowed into the 1 L chlorine contact tank to allow the residual chlorine to continue to react with any residual ammonia. Finally, water overflowed the chlorine contact tank with 0 to 300 ppm residual free and total chlorine, 0 to 0.3 ppm $NH_3$—N, and 0 to 2 ppm reactive phosphorus. Water from this point was recorded as effluent water. A summary of the data is shown in Table 6. Water then flowed into the galvanic system to have any residual phosphorus, bleach, and undesired oxidation byproducts removed.

TABLE 6

Example 9 data. Mixing tank pH = 8.5. All samples are averaged, and are given in ppm.

| | Na | K | Mg | Ca | Cl | NO$_2$ | Br | SO$_4$ | NO$_3$ | HACH reactive P | HACH NH$_3$ | HACH Total chlorine | HACH Free chlorine |
|---|---|---|---|---|---|---|---|---|---|---|---|---|---|
| Influent | 4023.81 | 258.89 | 522.26 | 301.38 | 6263.96 | 0.00 | 19.56 | 3783.75 | 0.11 | 121.00 | 268.00 | 0.00 | 0 |
| Post-settling tank | 4113.27 | 243.64 | 438.33 | 185.42 | 6287.68 | 0.00 | 18.89 | 3911.73 | 0.11 | 6.06 | 174.74 | 0.00 | 0 |
| Effluent | 4466.70 | 241.31 | 413.78 | 181.90 | 6130.76 | 0.00 | 10.50 | 3841.10 | 8.16 | 1.01 | 1.28 | 5.15 | 4.9 |

Example 10. Evaluation of Increasing pH and the Resulting Phosphorus and Ammonia Removal Example 10 was conducted in a similar way to Example 9 with the main exception being that the mixing tank pH was adjusted to 9.3 and not 8.5. This change in pH resulted in around 4200 ppm of solids to precipitate in the mixing tank and combine with the flocculant to be filtered out. Water leaving the mixing tank had between 0 and 2 ppm reactive phosphorus and between 150 and 200 ppm NH$_3$—N after filtration through the 5-micron bag filter.

The water made its way to the electrolysis tank in a similar manner to Example 9. Once in the electrolysis cell, the electrolysis proceeded in a similar manner with the main exceptions being less solids precipitating on the stainless-steel cathode, less frequent cleaning of the cathode required, and less sodium hydroxide required to maintain the appropriate pH of 7. Water overflowed the electrolysis tank with 0 to 0.5 ppm reactive phosphorus, 0 to 1 ppm NH$_3$—N, and 0 to 300 ppm residual free and total chlorine.

Water overflowed into the 1 L chlorine contact tank to allow the residual chlorine to continue to react with any residual ammonia. Finally, water overflowed the chlorine contact tank with 0 to 300 ppm residual free and total chlorine, 0 to 0.3 ppm NH$_3$—N, and 0 to 0.5 ppm reactive phosphorus. A summary of the data is shown in Table 7.

TABLE 7

Example 10 data. Mixing tank pH = 9.3. All samples are averaged, and are given in ppm.

| | Na | K | Mg | Ca | Cl | NO$_2$ | Br | SO$_4$ | NO$_3$ | HACH reactive P | HACH NH$_3$ | HACH Total chlorine | HACH Free chlorine |
|---|---|---|---|---|---|---|---|---|---|---|---|---|---|
| Influent | 3916.09 | 244.01 | 517.33 | 282.73 | 7461.48 | 0.00 | 20.11 | 4368.30 | 3.06 | 144.40 | 260.00 | 0.00 | 0 |
| Post-settling tank | 4268.89 | 248.96 | 435.97 | 126.82 | 5938.43 | 0.00 | 17.92 | 3531.69 | 0.00 | 1.19 | 179.00 | 0.00 | 0 |
| Effluent | 4415.53 | 240.53 | 391.67 | 126.77 | 5847.78 | 0.00 | 3.04 | 3557.15 | 9.28 | 0.22 | 0.33 | 24.50 | 18.5 |

Example 11. Evaluation of Current Density, the Resulting Production of Hypochlorite and Corresponding Reduction of Ammonia Example 11 was performed in a similar manner to Example 10. In Example 11, the effect of varying current densities on the production of bleach and the removal of ammonia was examined.

The water passed through the mixing tank, settling tank, electrolysis tank, and contact tank in a similar manner as Example 10.

The current passed through the electrode was tested at 8 amps, 7.5 amps, 7 amps, and 6.5 amps with other features remaining constant. Higher currents produced more bleach than lower currents, as shown in Table 8, but all densities produced enough bleach to completely remove all ammonia. 6.5 amps was found to be approximately optimal for the concentration of ammonia in this Example.

TABLE 8

Example 11 data. Effect of current density on bleach production. All samples are averaged and are given in ppm unless otherwise indicated.

| | Current (amps) | Na | K | Mg | Ca | Cl | NO$_2$ | Br | SO$_4$ | NO$_3$ | HACH reactive P | HACH NH$_3$ | HACH Total chlorine | HACH Free chlorine |
|---|---|---|---|---|---|---|---|---|---|---|---|---|---|---|
| Influent | | 3916.09 | 244.01 | 517.33 | 282.73 | 7461.48 | 0.00 | 20.11 | 4368.30 | 3.06 | 144.40 | 260.00 | 0.00 | 0 |
| Post-settling tank | 8.00 | 4174.58 | 260.06 | 427.65 | 114.75 | 6026.89 | 0.00 | 19.13 | 3533.59 | 0.29 | 1.36 | 172.00 | 0.00 | 0 |

TABLE 8-continued

Example 11 data. Effect of current density on bleach production. All samples are averaged and are given in ppm unless otherwise indicated.

| | Current (amps) | Na | K | Mg | Ca | Cl | $NO_2$ | Br | $SO_4$ | $NO_3$ | HACH reactive P | HACH $NH_3$ | HACH Total chlorine | HACH Free chlorine |
|---|---|---|---|---|---|---|---|---|---|---|---|---|---|---|
| Effluent | 8.00 | 4508.14 | 262.63 | 414.95 | 127.16 | 5943.88 | 0.00 | 5.80 | 3633.66 | 15.01 | 0.25 | 0.17 | 163.00 | 177 |
| Post-settling tank | 7.5 | 4229.63 | 262.36 | 432.20 | 115.03 | 6065.58 | 0.00 | 19.49 | 3527.75 | 0.20 | 1.28 | 169.00 | 0.00 | 0 |
| Effluent | 7.50 | 4443.67 | 255.31 | 388.65 | 113.20 | 5955.52 | 0.00 | 4.92 | 3604.57 | 12.84 | 0.15 | 0.13 | 158.00 | 142 |
| Post-settling tank | 7.00 | 4142.25 | 254.03 | 423.20 | 119.52 | 6063.88 | 0.00 | 18.98 | 3593.83 | 0.26 | 1.26 | 173.00 | 0.00 | 0 |
| Effluent | 7.00 | 4354.75 | 246.74 | 379.66 | 109.21 | 5815.93 | 0.00 | 4.86 | 3468.08 | 11.25 | 0.18 | 0.19 | 91.00 | 78 |
| Post-settling tank | 6.50 | 4147.71 | 256.42 | 426.90 | 124.55 | 5991.91 | 0.00 | 17.87 | 3539.38 | 0.00 | 1.23 | 174.00 | 0.00 | 0 |
| Effluent | 6.50 | 4302.04 | 248.59 | 392.33 | 109.00 | 5864.98 | 0.00 | 5.15 | 3522.07 | 9.40 | 0.33 | 0.29 | 58.00 | 50 |

The terms and expressions that have been employed are used as terms of description and not of limitation, and there is no intention in the use of such terms and expressions of excluding any equivalents of the features shown and described or portions thereof, but it is recognized that various modifications are possible within the scope of the embodiments of the present invention. Thus, it should be understood that although the present invention has been specifically disclosed by specific embodiments and optional features, modification and variation of the concepts herein disclosed may be resorted to by those of ordinary skill in the art, and that such modifications and variations are considered to be within the scope of embodiments of the present invention.

EXEMPLARY EMBODIMENTS

The following exemplary embodiments are provided, the numbering of which is not to be construed as designating levels of importance:

Embodiment 1 provides a method of removing phosphorus and nitrogen from water, the method comprising:
passing starting material water comprising nitrogen and phosphorus through an elevated pH phosphorus removal stage comprising
raising pH of the water to greater than or equal to 7.5 to precipitate a phosphorus salt from the water; and
removing the precipitated phosphorus salt from the water;
passing the water through an electrolytic nitrogen removal stage comprising passing the water through an electrolytic cell to remove nitrogen from the water as nitrogen gas; and
passing the water through a galvanic phosphorus removal stage comprising
immersing a galvanic cell in the water to form treated water comprising a salt that comprises phosphorus from the water, the galvanic cell comprising
an anode comprising Mg, Al, Fe, Zn, or a combination thereof,
a cathode having a different composition than the anode, the cathode comprising Cu, Ni, Fe, or a combination thereof; and
separating the salt comprising the phosphorus from the treated water;
wherein the water produced by the method has a lower phosphorus concentration and a lower nitrogen concentration than the starting material water.

Embodiment 2 provides the method of Embodiment 1, wherein the starting material water is water from a phosphate mine reservoir.

Embodiment 3 provides the method of any one of Embodiments 1-2, wherein the starting material water is water originated from a process of dissolving phosphate-containing rock to produce phosphoric acid.

Embodiment 4 provides the method of any one of Embodiments 1-3, wherein the starting material water has a pH of less than 7.5.

Embodiment 5 provides the method of any one of Embodiments 1-4, wherein the starting material water has a pH of 4-5.

Embodiment 6 provides the method of any one of Embodiments 1-5, wherein the phosphorus in the starting material water is in the form of elemental phosphorus, inorganic phosphorus, organic phosphorus, a dissolved form of phosphorus, a solid form of phosphorus, oxidized phosphorus, or a combination thereof.

Embodiment 7 provides the method of any one of Embodiments 1-6, wherein the starting material water has an ammonia concentration of 50 ppm to 5,000 ppm.

Embodiment 8 provides the method of any one of Embodiments 1-7, wherein the starting material water has an ammonia concentration of 150 ppm to 400 ppm.

Embodiment 9 provides the method of any one of Embodiments 1-8, wherein the starting material water has a reactive phosphorus concentration of 10 ppm to 10,000 ppm.

Embodiment 10 provides the method of any one of Embodiments 1-9, wherein the starting material water has a reactive phosphorus concentration of 50 ppm to 400 ppm.

Embodiment 11 provides the method of any one of Embodiments 1-10, wherein the starting material water has a sodium concentration of 50 ppm to 20,000 ppm.

Embodiment 12 provides the method of any one of Embodiments 1-11, wherein the starting material water has a sodium concentration of 400 ppm to 5,000 ppm.

Embodiment 13 provides the method of any one of Embodiments 1-12, wherein the starting material water has a magnesium concentration of 10 ppm to 10,000 ppm.

Embodiment 14 provides the method of any one of Embodiments 1-13, wherein the starting material water has a magnesium concentration of 50 ppm to 600 ppm.

Embodiment 15 provides the method of any one of Embodiments 1-14, wherein the starting material water has a chloride concentration of 50 ppm to 40,000 ppm.

Embodiment 16 provides the method of any one of Embodiments 1-15, wherein the starting material water has a chloride concentration of 200 ppm to 10,000 ppm.

Embodiment 17 provides the method of any one of Embodiments 1-16, wherein the water produced by the method has a total phosphorus concentration of about 0 ppm to about 1 ppm.

Embodiment 18 provides the method of any one of Embodiments 1-17, wherein the water produced by the method has a total phosphorus concentration of about 0.0001 ppm to 0.1 ppm.

Embodiment 19 provides the method of any one of Embodiments 1-18, wherein the water produced by the method has a total phosphorus concentration of about 0.0001 ppm to 0.05 ppm.

Embodiment 20 provides the method of any one of Embodiments 1-19, wherein the water produced by the method has a dissolved phosphorus concentration of about 0 ppm to about 1 ppm.

Embodiment 21 provides the method of any one of Embodiments 1-20, wherein the water produced by the method has a dissolved phosphorus concentration of about 0.0001 ppm to 0.1 ppm.

Embodiment 22 provides the method of any one of Embodiments 1-21, wherein the water produced by the method has a dissolved phosphorus concentration of about 0.0001 ppm to 0.05 ppm.

Embodiment 23 provides the method of any one of Embodiments 1-22, wherein the water produced by the method has a reactive phosphorus concentration of about 0 ppm to about 1 ppm.

Embodiment 24 provides the method of any one of Embodiments 1-23, wherein the water produced by the method has a reactive phosphorus concentration of about 0.0001 ppm to 0.1 ppm.

Embodiment 25 provides the method of any one of Embodiments 1-24, wherein the water produced by the method has a reactive phosphorus concentration of about 0.0001 ppm to 0.05 ppm.

Embodiment 26 provides the method of any one of Embodiments 1-25, wherein the water produced by the method has a total nitrogen concentration of about 0 ppm to about 2 ppm.

Embodiment 27 provides the method of any one of Embodiments 1-26, wherein the water produced by the method has a total nitrogen concentration of about 0 ppm to about 1 ppm.

Embodiment 28 provides the method of any one of Embodiments 1-27, wherein the water produced by the method has a dissolved nitrogen concentration of about 0 ppm to about 2 ppm.

Embodiment 29 provides the method of any one of Embodiments 1-28, wherein the water produced by the method has a dissolved nitrogen concentration of about 0 ppm to about 1 ppm.

Embodiment 30 provides the method of any one of Embodiments 1-29, wherein raising pH of the water to precipitate the phosphorus salt from the water comprises raising the pH of the water to 7.5 to 12.

Embodiment 31 provides the method of any one of Embodiments 1-30, wherein raising pH of the water to precipitate the phosphorus salt from the water comprises raising the pH of the water to 8.5 to 9.5.

Embodiment 32 provides the method of any one of Embodiments 1-31, wherein raising pH of the water to precipitate the phosphorus salt from the water comprises adding one or more bases to the water.

Embodiment 33 provides the method of any one of Embodiments 1-32, wherein raising pH of the water to precipitate the phosphorus salt from the water comprises adding one or more flocculants to the water.

Embodiment 34 provides the method of any one of Embodiments 1-33, wherein removing the precipitated phosphorus salt from the water comprises decantation, settling, filtration, or a combination thereof.

Embodiment 35 provides the method of any one of Embodiments 1-34, wherein the precipitated phosphorus salt comprises struvite, calcium phosphate, or a combination thereof.

Embodiment 36 provides the method of any one of Embodiments 1-35, wherein the elevated pH phosphorus removal stage removes 70-100% of the reactive phosphorus in the water.

Embodiment 37 provides the method of any one of Embodiments 1-36, wherein the elevated pH phosphorus removal stage removes 90-98% of reactive phosphorus in the water.

Embodiment 38 provides the method of any one of Embodiments 1-37, wherein the elevated pH phosphorus removal stage removes 0-60% of ammonia in the water.

Embodiment 39 provides the method of any one of Embodiments 1-38, wherein the elevated pH phosphorus removal stage removes 20-30% of ammonia in the water.

Embodiment 40 provides the method of any one of Embodiments 1-39, wherein the elevated pH phosphorus removal stage comprises raising pH of the water using one or more bases to 8.5 to 9.5 and removing precipitated phosphorus salt using decantation, settling, filtration, or a combination thereof, the precipitated phosphorus salt comprising struvite, calcium phosphate, or a combination thereof, wherein the elevated pH phosphorus removal stage removes 90-98% of reactive phosphorus in the water.

Embodiment 41 provides the method of any one of Embodiments 1-40, wherein the water is passed through a plurality of the electrolytic cells.

Embodiment 42 provides the method of any one of Embodiments 1-41, wherein passing the water through the electrolytic cell comprises partially submerging the electrolytic cell in the water.

Embodiment 43 provides the method of any one of Embodiments 1-42, wherein passing the water through the electrolytic cell comprises completely immersing the electrolytic cell in the water.

Embodiment 44 provides the method of any one of Embodiments 1-43, further comprising applying shear to the water as it is passed through the electrolytic cell.

Embodiment 45 provides the method of any one of Embodiments 1-44, wherein the water is passed around and between an anode and cathode of the electrolytic cell.

Embodiment 46 provides the method of any one of Embodiments 1-45, wherein the water passed through the electrolytic cell has a pH of 6 to 12.

Embodiment 47 provides the method of any one of Embodiments 1-46, wherein the water passed through the electrolytic cell has a pH of 6 to 7.

Embodiment 48 provides the method of any one of Embodiments 1-47, further comprising adding one or more bases to the water to regulate pH of the water contacting the electrolytic cell.

Embodiment 49 provides the method of any one of Embodiments 1-48, comprising operating the electrolytic cell with DC current.

Embodiment 50 provides the method of any one of Embodiments 1-49, comprising operating the electrolytic cell with AC current.

Embodiment 51 provides the method of any one of Embodiments 1-50, comprising operating the electrolytic cell with a current density of 0.001-0.1 A/cm$^2$.

Embodiment 52 provides the method of any one of Embodiments 1-51, comprising operating the electrolytic cell with a current density of 0.02-0.04 A/cm$^2$.

Embodiment 53 provides the method of any one of Embodiments 1-52, wherein the electrolytic cell comprises an anode and a cathode having a spacing therebetween of 0.5-8 mm.

Embodiment 54 provides the method of any one of Embodiments 1-53, wherein the electrolytic cell comprises an anode and a cathode having a spacing therebetween of 2-4 mm.

Embodiment 55 provides the method of any one of Embodiments 1-54, wherein the electrolytic cell comprises a cathode comprising titanium, stainless steel, or a combination thereof.

Embodiment 56 provides the method of any one of Embodiments 1-55, wherein the electrolytic cell comprises a cathode comprising stainless steel.

Embodiment 57 provides the method of any one of Embodiments 1-56, wherein the electrolytic cell comprises an anode comprising
   titanium oxide, ruthenium oxide, and iridium oxide supported on titanium ($TiO_2$—$RuO_2$—$IrO_2$/Ti), or
   titanium oxide and ruthenium oxide supported on titanium ($TiO_2$—$RuO_2$/Ti), or
   titanium and platinum (Ti—Pt), or
   a combination thereof.

Embodiment 58 provides the method of any one of Embodiments 1-57, wherein the removing of nitrogen as nitrogen gas comprises converting ammonia in the water to nitrogen gas using the electrolytic cell.

Embodiment 59 provides the method of any one of Embodiments 1-58, wherein passing the water through the electrolytic nitrogen removal stage produces hypochlorite which reacts with ammonia in the water to form the nitrogen gas.

Embodiment 60 provides the method of any one of Embodiments 1-59, further comprising releasing the nitrogen gas to the atmosphere.

Embodiment 61 provides the method of any one of Embodiments 1-60, wherein passing the water through the electrolytic nitrogen removal stage removes 80-100% of ammonia from the water.

Embodiment 62 provides the method of any one of Embodiments 1-61, wherein passing the water through the electrolytic nitrogen removal stage removes 99-100% of ammonia from the water.

Embodiment 63 provides the method of any one of Embodiments 1-62, wherein passing the water through the electrolytic nitrogen removal stage removes 0.1 to 90% of reactive phosphorus from the water.

Embodiment 64 provides the method of any one of Embodiments 1-63, wherein passing the water through the electrolytic nitrogen removal stage removes 1-30% of reactive phosphorus from the water.

Embodiment 65 provides the method of any one of Embodiments 1-64, wherein the electrolytic cell produces 100-20,000 ppm of hypochlorite from chloride in the water.

Embodiment 66 provides the method of any one of Embodiments 1-65, wherein the electrolytic cell produces 2000-2500 ppm hypochlorite from chloride in the water.

Embodiment 67 provides the method of any one of Embodiments 1-66, wherein:
   wherein passing the water through the electrolytic nitrogen removal stage produces hypochlorite which reacts with ammonia in the water to form the nitrogen gas;
   the cathode comprising stainless steel;
   the anode comprises titanium oxide, ruthenium oxide, and iridium oxide supported on titanium ($TiO_2$—$RuO_2$—$IrO_2$/Ti); and
   passing the water through the electrolytic nitrogen removal stage removes 80-100% of ammonia from the water.

Embodiment 68 provides the method of any one of Embodiments 1-67, wherein the anode and the cathode of the galvanic cell directly contact one another.

Embodiment 69 provides the method of any one of Embodiments 1-68, wherein the galvanic cell further comprises a conductive connector that electrically connects the anode and the cathode, the conductive connector comprising Cu, Zn, Fe, Cd, Ni, Sn, Pb, or a combination thereof.

Embodiment 70 provides the method of Embodiment 69, wherein the conductive connector comprises brass.

Embodiment 71 provides the method of any one of Embodiments 1-70, wherein the galvanic phosphorus removal stage:
   reduces total phosphorus concentration of the water by about 80% to about 100%, or
   reduces dissolved phosphorus concentration of the water by about 80% to about 100%, or
   reduces reactive phosphorus concentration of the water by about 80% to about 100%, or
   reduces total nitrogen concentration of the water by about 70% to about 100%, or
   reduces a dissolved nitrogen concentration of the water by about 70% to about 100%, or
   a combination thereof.

Embodiment 72 provides the method of any one of Embodiments 1-71, wherein the salt comprising the phosphorus comprises a material from the anode of the galvanic cell.

Embodiment 73 provides the method of any one of Embodiments 1-72, further comprising applying mechanical force to the galvanic cell during the immersing of the galvanic cell in the water, or applying shear to the water during the immersing of the galvanic cell in the water, or a combination thereof, wherein the mechanical force and/or shear is sufficient to
   dislodge at least some bubbles comprising $H_2$ from the surface of the anode, cathode, or a combination thereof, or
   at least partially prevent oxide formation at the surface of the anode, or
   at least partially prevent agglomeration of the salt comprising the phosphorus on the surface of the anode, or
   a combination thereof.

Embodiment 74 provides the method of any one of Embodiments 1-73, further comprising forming a salt comprising nitrogen from the water during the immersing of the galvanic cell in the water, wherein the separating of the salt comprising the phosphorus from the treated water further comprises separating the salt comprising the nitrogen from the treated water.

Embodiment 75 provides the method of any one of Embodiments 1-74, wherein the cathode comprises Cu and the anode comprises Mg.

Embodiment 76 provides the method of any one of Embodiments 1-75, wherein the cathode comprises Cu and the anode comprises Al.

Embodiment 77 provides the method of any one of Embodiments 1-76, wherein the cathode comprises a planar frame of the galvanic cell and a cathode material comprised within a perimeter of the frame, wherein the cathode material is electrically connected to the frame, wherein the cathode material comprised within the perimeter of the planar frame comprises a porous cathode material.

Embodiment 78 provides the method of any one of Embodiments 1-77, comprising
immersing one or more of the galvanic cells in an enclosure comprising the water;
filtering the salt comprising the phosphorus from the treated water via one of more filters that are at least partially submerged in the water that immerses the galvanic cells.

Embodiment 79 provides the method of any one of Embodiments 1-78, wherein
the cathode of the galvanic cell comprises a planar frame of the galvanic cell having a polygonal perimeter and a porous material comprised within the perimeter of the frame that is a wire mesh or a wire screen that is in direct contact with the frame; and
the planar frame comprises a plurality of the anodes fastened to the frame, and a plurality of conductive connectors that electrically connect the anode and the cathode, the conductive connector comprising Cu, Zn, Fe, Cd, Ni, Sn, Pb, or a combination thereof;
wherein each anode is a strip fastened to the planar frame at two opposite edges of the planar frame on a face of the frame, wherein each of the anodes is fastened to the planar frame with at least one of the conductive connectors at each of the two edges of the planar frame, such that each of the anodes on the face are approximately parallel to one another on the face and span across the porous material comprised within the perimeter of the planar frame forming a gap 5 between the porous material comprised within the perimeter of the planar frame and the anode strip, wherein each anode directly contacts the planar frame at each of the edges of the planar frame where the anode is fastened to the planar frame via the at least one conductive connector, wherein the plurality of the anodes are spaced-apart across the face of the such that they do not physically contact one another, and wherein the gap is about 1 mm to about 110 mm.

Embodiment 80 provides the method of any one of Embodiments 1-79, wherein:
the water immersing the galvanic cell has a pH of about 5 to about 7;
the salt comprising the phosphorus formed in the galvanic phosphorus removal stage comprises
$AlPO_4$ or a hydrate thereof, the $AlPO_4$ comprising the phosphorus and Al from the anode,
aluminum hydroxide or a hydrate thereof, the aluminum hydroxide comprising Al from the anode, or
a combination thereof;
the anode of the galvanic cell comprises Al, wherein the anode is about 90 wt % to about 100 wt % Al;
the cathode of the galvanic cell comprises Cu, wherein the cathode is about 90 wt % to about 100 wt % Cu; and
the galvanic cell comprises a conductive connector that electrically connects the anode and the cathode, the conductive connector comprising an alloy comprising Cu and Zn.

Embodiment 81 provides the method of any one of Embodiments 1-79, wherein:
the water immersing the galvanic cell has a pH of about 10 to about 11;
the salt comprising the phosphorus formed in the galvanic phosphorus removal stage comprises
magnesium phosphate, magnesium potassium phosphate, a hydrate thereof, or a combination thereof,
$NH_4MgPO_4$ or a hydrate thereof, the $NH_4MgPO_4$ comprising the phosphorus and Mg from the anode,
$Mg(OH)_2$ comprising Mg from the anode, or
a combination thereof;
the anode of the galvanic cell comprises Mg, wherein the anode is about 90 wt % to about 100 wt % Mg;
the cathode of the galvanic cell comprises Cu, wherein the cathode is about 90 wt % to about 100 wt % Cu; and
the galvanic cell comprises a conductive connector that electrically connects the anode and the cathode, the conductive connector comprising an alloy comprising Cu and Zn.

Embodiment 82 provides the method of any one of Embodiments 1-81, further comprising further removing nitrogen from water produced by the galvanic phosphorus removal stage.

Embodiment 83 provides the method of Embodiment 82, wherein the further removing nitrogen comprises exposing the water to denitrifying bacteria to convert water-soluble nitrogen therein to nitrogen gas that is removed.

Embodiment 84 provides the method of any one of Embodiments 82-83, comprising deoxygenating the water prior to the further removing of nitrogen therefrom.

Embodiment 85 provides the method of any one of Embodiments 82-84, comprising oxidizing or hydrolyzing at least some nitrogen in the water to form nitrate prior to the further removing of nitrogen therefrom.

Embodiment 86 provides the method of any one of Embodiments 82-85, comprising reoxygenating the water after the further removing of nitrogen therefrom Embodiment 87 provides the method of any one of Embodiments 1-86, further comprising removing nitrogen from water produced by the galvanic phosphorus removal stage, the further removing nitrogen comprising:
optionally oxidizing or hydrolyzing at least some nitrogen in the water to form nitrate;
optionally deoxygenating the water to an oxygen concentration of about 0 ppm to about 0.3 ppm;
exposing the water to denitrifying bacteria immobilized on a porous substrate, to convert nitrate in the water to nitrogen gas that is removed and to form a denitrified water; and
optionally reoxygenating the denitrified water to an oxygen concentration of about 1 ppm to about 20 ppm;
wherein the denitrified water has a total nitrogen concentration that is about 0.0 ppm to about 2 ppm total nitrogen.

Embodiment 88 provides a method of removing phosphorus and nitrogen from water, the method comprising:
passing starting material water comprising nitrogen and phosphorus through an elevated pH phosphorus removal stage, comprising
raising pH of the water using one or more bases to 8.5 to 9.5 to precipitate a phosphorus salt from the water comprising struvite, calcium phosphate, or a combination thereof; and removing the precipitated phosphorus salt from the water, wherein the elevated pH phosphorus removal stage removes 90-98% of reactive phosphorus in the water;

passing the water through an electrolytic nitrogen removal stage comprising passing the water through an electrolytic cell to remove nitrogen from the water as nitrogen gas, the electrolytic cell comprising a cathode comprising stainless steel and an anode that comprises titanium oxide, ruthenium oxide, and iridium oxide supported on titanium ($TiO_2$—$RuO_2$—$IrO_2$/Ti), wherein passing the water through the electrolytic nitrogen removal stage removes 80-100% of ammonia from the water; and passing the water through a galvanic phosphorus removal stage comprising immersing a galvanic cell in the water to form treated water comprising a salt that comprises phosphorus from the water, the salt comprising $AlPO_4$ or a hydrate thereof, the $AlPO_4$ comprising the phosphorus and Al from the anode, aluminum hydroxide or a hydrate thereof, the aluminum hydroxide comprising Al from the anode, or a combination thereof;

the galvanic cell comprising an anode comprising Al, wherein the anode is about 90 wt % to about 100 wt % Al, a cathode comprising Cu, wherein the cathode is about 90 wt % to about 100 wt % Cu, a conductive connector that electrically connects the anode and the cathode, the conductive connector comprising an alloy comprising Cu and Zn separating the salt comprising the phosphorus from the treated water;

wherein the water produced by the method has a lower phosphorus concentration and a lower nitrogen concentration than the starting material water, wherein the water produced by the method has a total phosphorus concentration of about 0.0001 ppm to 0.05 ppm, and a total nitrogen concentration of about 0 ppm to about 1 ppm.

Embodiment 89 provides a method of removing nitrogen from water, the method comprising:

passing the water through an electrolytic cell to remove nitrogen from the water as nitrogen gas.

Embodiment 90 provides the method of Embodiment 89, wherein prior to passing through the electrolytic cell the water has a chloride concentration of 50 ppm to 40,000 ppm.

Embodiment 91 provides the method of any one of Embodiments 89-90, wherein prior to passing through the electrolytic cell the water has a chloride concentration of 200 ppm to 10,000 ppm.

Embodiment 92 provides the method of any one of Embodiments 89-91, wherein the water is passed through a plurality of the electrolytic cells.

Embodiment 93 provides the method of any one of Embodiments 89-92, wherein passing the water through the electrolytic cell comprises partially submerging the electrolytic cell in the water.

Embodiment 94 provides the method of any one of Embodiments 89-93, wherein passing the water through the electrolytic cell comprises completely immersing the electrolytic cell in the water.

Embodiment 95 provides the method of any one of Embodiments 89-94, further comprising applying shear to the water as it is passed through the electrolytic cell.

Embodiment 96 provides the method of any one of Embodiments 89-95, wherein the water is passed around and between an anode and cathode of the electrolytic cell.

Embodiment 97 provides the method of any one of Embodiments 89-96, wherein the water passed through the electrolytic cell has a pH of 6 to 12.

Embodiment 98 provides the method of any one of Embodiments 89-97, wherein the water passed through the electrolytic cell has a pH of 6 to 7.

Embodiment 99 provides the method of any one of Embodiments 89-98, further comprising adding one or more bases to the water to regulate pH of the water contacting the electrolytic cell.

Embodiment 100 provides the method of any one of Embodiments 89-99, comprising operating the electrolytic cell with DC current.

Embodiment 101 provides the method of any one of Embodiments 89-100, comprising operating the electrolytic cell with AC current.

Embodiment 102 provides the method of any one of Embodiments 89-101, comprising operating the electrolytic cell with a current density of 0.001-0.1 $A/cm^2$.

Embodiment 103 provides the method of any one of Embodiments 89-102, comprising operating the electrolytic cell with a current density of 0.02-0.04 $A/cm^2$.

Embodiment 104 provides the method of any one of Embodiments 89-103, wherein the electrolytic cell comprises an anode and a cathode having a spacing therebetween of 0.5-8 mm.

Embodiment 105 provides the method of any one of Embodiments 89-104, wherein the electrolytic cell comprises an anode and a cathode having a spacing therebetween of 2-4 mm.

Embodiment 106 provides the method of any one of Embodiments 89-105, wherein the electrolytic cell comprises a cathode comprising titanium, stainless steel, or a combination thereof.

Embodiment 107 provides the method of any one of Embodiments 89-106, wherein the electrolytic cell comprises a cathode comprising stainless steel.

Embodiment 108 provides the method of any one of Embodiments 89-107, wherein the electrolytic cell comprises an anode comprising titanium oxide, ruthenium oxide, and iridium oxide supported on titanium ($TiO_2$—$RuO_2$—$IrO_2$/Ti), or titanium oxide and ruthenium oxide supported on titanium ($TiO_2$—$RuO_2$/Ti), or titanium and platinum (Ti—Pt), or a combination thereof.

Embodiment 109 provides the method of any one of Embodiments 89-108, wherein the removing of nitrogen as nitrogen gas comprises converting ammonia in the water to nitrogen gas using the electrolytic cell.

Embodiment 110 provides the method of any one of Embodiments 89-109, wherein passing the water through the electrolytic nitrogen removal stage produces hypochlorite which reacts with ammonia in the water to form the nitrogen gas.

Embodiment 111 provides the method of any one of Embodiments 89-110, further comprising releasing the nitrogen gas to the atmosphere.

Embodiment 112 provides the method of any one of Embodiments 89-111, wherein passing the water through the electrolytic nitrogen removal stage removes 80-100% of ammonia from the water.

Embodiment 113 provides the method of any one of Embodiments 89-112, wherein passing the water through the electrolytic nitrogen removal stage removes 99-100% of ammonia from the water.

Embodiment 114 provides the method of any one of Embodiments 89-113, wherein passing the water through the electrolytic nitrogen removal stage removes 0.1 to 90% of reactive phosphorus from the water.

Embodiment 115 provides the method of any one of Embodiments 89-114, wherein passing the water through the electrolytic nitrogen removal stage removes 1-30% of reactive phosphorus from the water.

Embodiment 116 provides the method of any one of Embodiments 89-115, wherein the electrolytic cell produces 100-20,000 ppm of hypochlorite from chloride in the water.

Embodiment 117 provides the method of any one of Embodiments 89-116, wherein the electrolytic cell produces 2000-2500 ppm hypochlorite from chloride in the water.

Embodiment 118 provides the method of any one of Embodiments 89-117, wherein:
wherein passing the water through the electrolytic nitrogen removal stage produces hypochlorite which reacts with ammonia in the water to form the nitrogen gas;
the cathode comprising stainless steel;
the anode comprises titanium oxide, ruthenium oxide, and iridium oxide supported on titanium ($TiO_2$—$RuO_2$—$IrO_2$/Ti); and
passing the water through the electrolytic nitrogen removal stage removes 80-100% of ammonia from the water.

Embodiment 119 provides a method of removing nitrogen from water, the method comprising:
passing the water through an electrolytic cell to remove nitrogen from the water as nitrogen gas, the electrolytic cell comprising a cathode comprising stainless steel and/or titanium and an anode comprising
titanium oxide, ruthenium oxide, and iridium oxide supported on titanium ($TiO_2$—$RuO_2$—$IrO_2$/Ti), or
titanium oxide and ruthenium oxide supported on titanium ($TiO_2$—$RuO_2$/Ti), or
titanium and platinum (Ti—Pt), or
a combination thereof;
wherein the removal of nitrogen as nitrogen gas removes 80-100% of ammonia from the water.

Embodiment 120 provides a system for removal of nitrogen and phosphorus from water, the system comprising:
an elevated pH phosphorus removal stage configured to raise pH of starting material water to greater than or equal to 7.5 to precipitate a phosphorus salt from the water and configured to remove the precipitated phosphorus salt from the water;
an electrolytic nitrogen removal stage comprising an electrolytic cell configured to remove nitrogen from the water as nitrogen gas; and
a galvanic phosphorus removal stage comprising a galvanic cell comprising an anode comprising Mg, Al, Fe, Zn, or a combination thereof, and a cathode having a different composition than the anode, the cathode comprising Cu, Ni, Fe, or a combination thereof, the galvanic cell configured to form a treated water comprising a salt that comprises phosphorus from the water, wherein the galvanic phosphorus removal stage is configured to separate the salt comprising the phosphorus from the treated water;
wherein the water produced by the system has a lower phosphorus concentration and a lower nitrogen concentration than the starting material water.

Embodiment 121 provides an apparatus for removal of nitrogen from water, the apparatus comprising:
an electrolytic cell through which water is configured to be flowed to remove nitrogen from the water as nitrogen gas, the electrolytic cell comprising a cathode comprising stainless steel and an anode comprising
titanium oxide, ruthenium oxide, and iridium oxide supported on titanium ($TiO_2$—$RuO_2$—$IrO_2$/Ti), or
titanium oxide and ruthenium oxide supported on titanium ($TiO_2$—$RuO_2$/Ti), or
titanium and platinum (Ti—Pt), or
a combination thereof;
wherein the removal of nitrogen as nitrogen gas removes 80-100% of ammonia from the water.

Embodiment 122 provides the method, system, or apparatus of any one or any combination of Embodiments 1-121 optionally configured such that all elements or options recited are available to use or select from.

What is claimed is:

1. A system for removal of nitrogen and phosphorus from starting material water, the system comprising:
an elevated pH phosphorus removal stage configured to raise pH of the starting material water from less than 7.5 to greater than or equal to 7.5 via addition of one or more bases thereto in a mixing tank to precipitate a phosphorus salt from the starting material water and configured to remove the precipitated phosphorus salt from the starting material water, to form water from the elevated pH phosphorus removal stage;
an electrolytic nitrogen removal stage comprising an electrolytic cell configured to contact the water from the elevated pH phosphorus removal stage with the electrolytic cell to remove nitrogen therefrom as nitrogen gas, to form water from the electrolytic nitrogen removal stage; and
a galvanic phosphorus removal stage configured to contact the water from the electrolytic nitrogen removal stage with a galvanic cell to form a precipitate comprising a salt that comprises phosphorus, wherein the galvanic phosphorus removal stage is configured to separate the salt comprising the phosphorus from the treated water to form water from the galvanic phosphorus removal stage, wherein the galvanic cell comprises
an anode comprising Al, or a combination thereof,
a cathode having a different composition than the anode, the cathode comprising Cu, and
a conductive connector that electrically and physically connects the anode and the cathode, the conductive connector comprising Cu, Zn, Fe, Cd, Ni, Sn, Pb, or a combination thereof, wherein the conductive connector comprises a screw, a bolt, or a combination thereof;
wherein the water from the galvanic phosphorus removal stage has a lower phosphorus concentration and a lower nitrogen concentration than the starting material water.

2. The system of claim 1, wherein the cathode comprises a porous cathode material.

3. The system of claim 1, wherein the cathode comprises a porous cathode material comprising wire, mesh, screen, a sheet comprising one or more through-holes, or a combination thereof.

4. The system of claim 1, wherein the cathode comprises a porous cathode material comprising a wire mesh or a wire screen.

5. The system of claim 1, wherein the conductive connector comprises Cu and Zn.

6. The system of claim 1, wherein the conductive connector comprises brass.

7. The system of claim 1, wherein the system is configured for the starting material water having a chloride concentration of 200 ppm to 10,000 ppm.

8. The system of claim 1, wherein the water from the galvanic phosphorus removal stage has a total phosphorus concentration, a dissolved phosphorus concentration, a reactive phosphorus concentration as measured according to US EPA Method 365.1, or a combination thereof, of 0.0001 ppm to 0.1 ppm, and a total nitrogen concentration, a dissolved nitrogen concentration, or a combination thereof, of about 0 ppm to about 1 ppm.

9. The system of claim 1, wherein raising pH of the starting material water to precipitate the phosphorus salt therefrom comprises raising the pH of the starting material water to 8.5 to 9.5.

10. The system of claim 1, wherein the precipitated phosphorus salt comprises struvite, calcium phosphate, or a combination thereof.

11. The system of claim 1, wherein the electrolytic cell comprises a cathode comprising titanium, stainless steel, or a combination thereof.

12. The system of claim 1, wherein the electrolytic cell comprises an anode comprising titanium oxide, ruthenium oxide, and iridium oxide supported on titanium ($TiO_2$—$RuO_2$—$IrO_2$/Ti), or titanium oxide and ruthenium oxide supported on titanium ($TiO_2$—$RuO_2$/Ti), or titanium and platinum (Ti—Pt), or a combination thereof.

13. The system of claim 1, wherein passing the water from the elevated pH phosphorus removal stage through the electrolytic nitrogen removal stage produces hypochlorite which reacts with ammonia in the water from the elevated pH phosphorus removal stage to form the nitrogen gas that is removed during the electrolytic nitrogen removal stage.

14. The system of claim 1, wherein the salt comprising the phosphorus comprises a material from the anode of the galvanic cell.

15. The system of claim 1, wherein the anode is about 90 wt % to about 100 wt % Al or Mg, and wherein the cathode is about 90 wt % to about 100 wt % Cu.

16. The system of claim 1, wherein:

the water from the electrolytic nitrogen removal stage immersing the galvanic cell has a pH of about 5 to about 7;

the anode of the galvanic cell comprises Al, wherein the anode is about 90 wt % to about 100 wt % Al;

the cathode of the galvanic cell comprises Cu, wherein the cathode is about 90 wt % to about 100 wt % Cu;

the conductive connector comprises an alloy comprising Cu and Zn; and the salt comprising the phosphorus formed in the galvanic phosphorus removal stage comprises $AlPO_4$ or a hydrate thereof, the $AlPO_4$ comprising the phosphorus and Al from the anode, aluminum hydroxide or a hydrate thereof, the aluminum hydroxide comprising Al from the anode, or a combination thereof.

17. The system of claim 1, wherein the elevated pH phosphorus removal stage is configured to remove 90-98% of reactive phosphorus in the starting material water as measured according to US EPA Method 365.1.

18. A system for removal of nitrogen and phosphorus from starting material water, the system comprising:

an elevated pH phosphorus removal stage configured to raise pH of the starting material water comprising both nitrogen and phosphorus to greater than or equal to 8.5 to 9.5 to precipitate a phosphorus salt from the water, the phosphorus salt comprising struvite, calcium phosphate, or a combination thereof, and configured to remove the precipitated phosphorus salt from the water, to form water from the elevated pH phosphorus removal stage, wherein the elevated pH phosphorus removal stage is configured to remove 90-98% of reactive phosphorus in the starting material water as measured according to US EPA Method 365.1;

an electrolytic nitrogen removal stage comprising an electrolytic cell configured to contact the water from the elevated pH phosphorus removal stage with the electrolytic cell to remove nitrogen therefrom as nitrogen gas, to form water from the electrolytic nitrogen removal stage, the electrolytic cell comprising a cathode comprising stainless steel and an anode that comprises titanium oxide, ruthenium oxide, and iridium oxide supported on titanium ($TiO_2$—$RuO_2$—$IrO_2$/Ti), wherein passing the water from the elevated pH phosphorus removal stage through the electrolytic nitrogen removal stage removes 80-100% of ammonia therefrom; and a galvanic phosphorus removal stage configured to contact the water from the electrolytic nitrogen removal stage with a galvanic cell to form a precipitate comprising a salt that comprises phosphorus, the salt comprising $AlPO_4$ or a hydrate thereof, the $AlPO_4$ comprising the phosphorus and Al from the anode, aluminum hydroxide or a hydrate thereof, the aluminum hydroxide comprising Al from the anode, or a combination thereof, wherein the galvanic phosphorus removal stage is configured to separate the salt comprising the phosphorus from the treated water to form water from the galvanic phosphorus removal stage, wherein the galvanic cell comprises an anode comprising Al, wherein the anode is about 90 wt % to about 100 wt % Al, a cathode having a different composition than the anode, the cathode comprising Cu, wherein the cathode is about 90 wt % to about 100 wt % Cu, and a conductive connector that electrically and physically connects the anode and the cathode, the conductive connector comprising an alloy comprising Cu and Zn, wherein the conductive connector comprises a screw, a bolt, or a combination thereof;

wherein the water from the galvanic phosphorus removal stage has a lower phosphorus concentration and a lower nitrogen concentration than the starting material water, wherein the water from the galvanic phosphorus removal stage has a total phosphorus concentration of about 0.0001 ppm to 0.05 ppm, and a total nitrogen concentration of about 0 ppm to about 1 ppm.

* * * * *